(12) United States Patent
Meador et al.

(10) Patent No.: US 12,266,073 B2
(45) Date of Patent: Apr. 1, 2025

(54) SYSTEM AND METHOD FOR THREE DIMENSIONAL CREATION OF A VIRTUAL GARMENT AND SIMULATING USE OF THE VIRTUAL GARMENT ON AN AVATAR OF AN END USER

(71) Applicant: Couture Technologies, LLC, Gallatin, TN (US)

(72) Inventors: Deanna Nicole Meador, Gallatin, TN (US); Marcelino Rodriquez Cancio, Nashville, TN (US)

(73) Assignee: Couture Technologies, LLC, Gallatin, TN (US)

( * ) Notice: Subject to any disclaimer, the term of this patent is extended or adjusted under 35 U.S.C. 154(b) by 183 days.

(21) Appl. No.: 18/108,475

(22) Filed: Feb. 10, 2023

(65) Prior Publication Data

US 2023/0252747 A1    Aug. 10, 2023

Related U.S. Application Data

(60) Provisional application No. 63/308,786, filed on Feb. 10, 2022.

(51) Int. Cl.
*G06T 19/20*    (2011.01)
*G06T 7/11*    (2017.01)
(Continued)

(52) U.S. Cl.
CPC ............... *G06T 19/20* (2013.01); *G06T 7/11* (2017.01); *G06T 7/60* (2013.01); *G06T 9/002* (2013.01);
(Continued)

(58) Field of Classification Search
CPC ............ G06T 19/20; G06T 7/11; G06T 7/60; G06T 9/002; G06T 15/04; G06T 17/20;
(Continued)

(56) References Cited

U.S. PATENT DOCUMENTS

2015/0134302 A1\* 5/2015 Chhugani ............... G06T 17/10
703/1
2020/0066029 A1\* 2/2020 Chen ..................... G06T 15/205
(Continued)

OTHER PUBLICATIONS

International Search Report and Written Opinion, PCT/US2023/012850, dated May 12, 2023, 8 pages.
(Continued)

*Primary Examiner* — Yu Chen
(74) *Attorney, Agent, or Firm* — Nelson Mullins Riley & Scarborough LLP; Anthony A. Laurentano

(57) ABSTRACT

A garment rendering system and associated method having a virtual garment generation unit, an avatar generation unit, a simulation engine, and a rendering unit. The virtual garment generation unit receives garment related data and generates in response to the garment related data virtual garment data. The garment related data includes garment image data and garment textual data. The avatar generation unit receives user data and generates, in response to the user data, user avatar data representative of an avatar of the user. The user data includes at least one of user image data and user biometric data. The simulation engine receives the user avatar and the virtual garment data and generates in response thereto simulated garment data representative of a simulated garment draped on the avatar. The rendering unit renders the simulated garment data received from the simulation engine and generates a rendered virtual image.

37 Claims, 11 Drawing Sheets

(51) Int. Cl.
*G06T 7/60* (2017.01)
*G06T 9/00* (2006.01)
*G06T 15/04* (2011.01)
*G06T 17/20* (2006.01)
*G06V 10/26* (2022.01)

(52) U.S. Cl.
CPC .............. *G06T 15/04* (2013.01); *G06T 17/20* (2013.01); *G06V 10/26* (2022.01); *G06T 2207/20021* (2013.01); *G06T 2207/20081* (2013.01); *G06T 2207/20084* (2013.01); *G06T 2207/30196* (2013.01); *G06T 2210/16* (2013.01); *G06T 2219/2021* (2013.01)

(58) Field of Classification Search
CPC ........... G06T 2207/20021; G06T 2207/20081; G06T 2207/20084; G06T 2207/30196; G06T 2210/16; G06T 2219/2021; G06V 10/26
See application file for complete search history.

(56) References Cited

U.S. PATENT DOCUMENTS

2020/0320769 A1* 10/2020 Chen .................... G06F 18/214
2021/0166478 A1* 6/2021 Pai ......................... G06T 17/20

OTHER PUBLICATIONS

Kyosev Y., "Material description for textile draping simulation: data structure, open data exchange formats and system for automatic analysis of experimental series," Textile Research Journal, vol. 92(9-10):1519-1536 (2021).

Shen, Y. et al., "GAN-Based Garment Generation Using Sewing Pattern Images," 16th European Conference—Computer Vision—ECCV 2020, 23 pages (2020).

Yuan, M. et al., "A Mixed Reality Virtual Clothes Try-On System," IEEE Transactions on Multimedia, vol. 15(8):1958-1968 (2013).

* cited by examiner

SYSTEM AND METHOD FOR THREE DIMENSIONAL CREATION OF A VIRTUAL GARMENT AND SIMULATING USE OF THE VIRTUAL GARMENT ON AN AVATAR OF AN END USER

RELATED APPLICATION

The present application claims priority to U.S. provisional patent application Ser. No. 63/308,786, filed Feb. 10, 2022, and entitled System and Methods For Three Dimensional Creation of a Garment and Simulating Use of The Garment on an Avatar of an End User, the contents of which are herein incorporated by reference.

BACKGROUND OF THE INVENTION

It is well known that people can shop for clothing or garments directly in stores or on-line at places that have a web-based presence. When the people shop for clothing in person, they have an opportunity to try on the clothes to assess the fit of the garment, the size of the garment, and the like. The person can then make an educated decision about whether to purchase the garment or not. When shopping on-line, the person has to guess at the proper size of the garment based on past purchases of garments with the same retailer or based on historical information about the best sizes that fit the person (e.g., fit chart), which is oftentimes quite inaccurate. The person, when purchasing the clothing on-line, only has an opportunity to try on the garment when actually received.

In an effort to address this drawback, prior art systems have been developed to aid or assist the person in selecting the proper size of the garments. This typically involves answering a set of predetermined questions so that the on-line retailer can then recommend an estimated bast size of the garment and the like. Unfortunately, these conventional size recommendation systems cannot show how the garment looks on the user, lacks the visual aspect of gauging fit (e.g., some users want looser fitting clothes, while others would like their clothes to fit more snuggly) and have failed to become standard in the art. Further, other prior art systems have attempted to allow the person to virtually "try on" clothes from the comfort of their homes. This cumbersome virtual technology typically involves employing varying combinations of augmented reality, artificial intelligence, cameras and other forms of sensors, and the like.

The prior art has also employed Virtual Try-On (VTON) systems. The VTON systems employ general information of the garment and the user so as to virtually determine or produce an image of the user wearing the garment. The VTON system can both provide sizing recommendations and a visual image allowing the user to initially understand how the garment may fit the user. Unfortunately, the conventional VTON systems typically cannot be configured to fulfill the capabilities for mass customization and personalization that the clothing industry requires. This is because, while an straightforward idea, VTON technical implementations are far from simple. First, the VTON system requires a way to convert the physical garment into a virtual garment and complex numerical calculations must be performed to recommend a fit and to produce a visual representation of the garment being worn by the user.

To produce virtual garments, the state of the art is to create virtual garments from a combination of Computer Aid Design (CAD) files, trained technicians, and three dimensional (3D) scanners. The CAD files, however, are extremely difficult to obtain and the 3D scanners introduce additional economic and logistical barriers.

The clothing generation engine employed by the prior art systems is a key component of the VTON system. The generation engine is configured to compute how a garment may look on an the user. The generation engine can employ either numerical simulations or generative adversarial networks (GANs) to perform this function. However, the numerical simulations are too slow for real-time image rendering. This limits the capability of the VTON system to a limited number of pre-defined simulations, never reaching the scale required by the garment industry and are unable to build entire outfits, in real-time, for the user. On the other hand, the GANs are limited to two-dimensional information and do not provide three-dimensional fitting information. Further, the GANs are similar to a paper doll dress up game, in the sense that they allow the user to paint the garment on top of an image of the user irrespective of the general fit of the garment.

Unfortunately, no prior art generation engine properly fulfills the capabilities for mass customization and personalization that the clothing industry requires. This drawback arises since numerical simulations are too slow for real-time rendering. This limits the ability of the virtual try-on generation engine to process a limited number of standard simulations, thus never reaching the scale required by the clothing industry. The prior art systems are also unable to generate or build outfits in real-time. A further drawback is that conventional GANs are limited to processing and providing two-dimensional (2D) information and do not provide 3D fitting information. As such, GANs can be deemed to be similar to a paper doll dress up game, in that the GANs can paint the clothing on top of a flat 2D avatar of the person no matter the fitting.

The generation of an accurate 3D avatar resembling any given real person is a challenging problem due to the high diversity of shapes of the human body, and this is even harder if the available input data is only a few images of the person. Conventional systems are available that allow the user to import or enter selected types of information, including body images (e.g., front and side) and biometric information, such as height and weight information. From this information, the systems can generate a virtual image or can generate brand size recommendations.

SUMMARY OF THE INVENTION

The present invention is directed to a garment rendering system for generating a simulated or virtual garment and an avatar of the user, and then overlaying or simulating use of the simulated garment on the user avatar. This allows the user to view the garment on the avatar and hence assess the likely fit of the garment were the user to purchase the garment. More specifically, the garment rendering system of the present invention provides is configured for creating or generating virtual garments from input garment related image data and textual data. This enables the system to generate the virtual garments in multiple ways. Further, the system allows the user to create user avatars using image data uploaded by the user without requiring the user to download a software application.

The present invention is directed to a garment rendering system having a virtual garment generation unit, an avatar generation unit, a simulation engine, and a rendering unit. The virtual garment generation unit receives garment related data and generates in response to the garment related data virtual garment data. The garment related data includes garment image data and garment textual data. The avatar generation unit receives user data and generates, in response to the user data, user avatar data representative of an avatar of the user. The user data includes at least one of user image data and user biometric data. The simulation engine receives the user avatar and the virtual garment data and generates in response thereto simulated garment data representative of a simulated garment draped on the avatar. The rendering unit renders the simulated garment data received from the simulation engine and generates a rendered virtual image.

The virtual garment generation unit includes a pattern determination unit, a mesher unit, and a material determination unit. The pattern determination unit is configured to receive the garment image data and the garment textual data and to generate two-dimensional garment pattern data based on the garment image and the garment textual data. The mesher unit is configured for receiving and processing the two dimensional garment pattern data and for generating, based thereon, a plurality of three-dimensional garment meshes forming at least part of the virtual garment data. The material determination unit is configured to determine a type of material associated with the garment based on the garment image data and the garment textual data. The mesher unit employs one or more meshing techniques for subdividing the two-dimensional garment pattern data into the plurality of three-dimensional garment meshes.

According to another aspect, the pattern determination unit can include a classification unit, an object detection unit, landmark extraction unit, and a pattern generation unit. The classification unit can be configured to classify the garment into one of a plurality of different categories indicative of different types of garments and for generating in response garment classification data. The object detection unit can be configured to receive the garment classification data and for detecting and extracting at least one garment segment from the classification data with an object detection model and for generating garment segment data. The landmark extraction unit is configured to receive the garment segment data and for detecting and extracting at least landmark feature present within the garment segment data and for generating landmark data. The pattern generation unit is configured to receive the landmark data and for generating in response two-dimensional garment pattern data.

The material determination unit can include a texture map determination unit for applying to the garment related data a semantic segmentation technique to generate one or more texture maps associated with the garment and a parameter determination unit for extracting from the garment textual data one or more fabric parameters associated with a fabric of the garment. The texture maps and the fabric parameters can form part of the virtual garment data.

According to one embodiment, the simulation engine can include a tailor unit for receiving the virtual garment data and encoding the virtual garment data with the garment image data to form encoded garment data, a solver unit for receiving the encoded garment data and generating based thereon the simulated garment data, and a feedback loop for feeding back the simulated garment data to the tailor unit for further processing thereby. According to another embodiment, the simulation engine can include a one shot network for receiving the virtual garment data and the avatar data and for generating based thereon the simulated garment data. The one-shot network can include a convolutional neural network.

According to still another embodiment, the simulation engine can include a tailor unit for receiving the virtual garment data and encoding the virtual garment data with the garment image data to form encoded garment data, a graph network configured for receiving the encoded garment data and for generating garment related training data, and a one-shot network configured for receiving the garment related training data in order to train the one-shot network. The one-shot network can be configured to receive the virtual garment data and the avatar data and for generating based thereon the simulated garment data. A feedback loop can also be included for feeding back the garment related training data to the tailor unit for further processing thereby.

The avatar generation unit can include a segmentation unit for processing the user image data and generating silhouette image data, and a machine learning unit for receiving the silhouette image data and the user biometric data to form input data, and for applying to the input data one or more machine learning models to generate the avatar. The machine learning model can include a deep learning regression model, and the machine learning unit can further generate a plurality of measurements forming part of the avatar related data by employing a learned mapping technique by mapping between a predefined human silhouette and a plurality of body measurements of the user. The avatar generation unit can also apply a statistical anthropomorphic analysis technique to the user biometric data.

The system of the present invention can also include a fit analysis unit for receiving the virtual garment data and the avatar data and for generating in response thereto garment fit data indicative of a fit of the virtual garment on the avatar. The virtual garment data is indicative of a virtual garment. The fit analysis unit can also be configured to segment the virtual garment into a plurality of garment segments, classify each of the plurality of segments into one or more garment related categories, and generate the garment fit data based on the one or more garment related categories. The fit analysis unit can also generate a texture map indicative of the fit of the garment on the avatar.

The present invention is also directed to a method for generating a rendered virtual image of a garment on an avatar of a user. The method can include generating, in response to receiving garment related data, virtual garment data with a virtual garment generation unit, wherein the garment related data includes garment image data and garment textual data; generating with an avatar generation unit, in response to receiving user data, user avatar data that is representative of the avatar of the user, wherein the user data includes at least one of user image data and user biometric data; generating with a simulation engine, in response to receiving the user avatar data and the virtual garment data, simulated garment data representative of a simulated garment draped on the avatar; and rendering the simulated garment data with a rendering unit and generating the rendered virtual image.

The method of generating the virtual garment data with the virtual garment generation unit can also include generating with a pattern determination unit, in response to receiving the garment image data and the garment textual data, two-dimensional garment pattern data based on the garment image and the garment textual data; generating with a mesher unit, in response to receiving and processing the two dimensional garment pattern data, a plurality of three-dimensional garment meshes forming at least part of the virtual garment data; and determining with a material determination unit a type of material associated with the garment based on the garment image data and the garment textual data. The mesher unit employs one or more meshing techniques comprising subdividing with the meshing technique the two-dimensional garment pattern data into the plurality of three-dimensional garment meshes.

The method of the present invention also includes, when generating with the pattern determination unit, classifying the garment into one of a plurality of different categories indicative of different types of garments and for generating in response garment classification data; detecting and extracting at least one garment segment from the garment classification data with an object detection model and for generating garment segment data; detecting and extracting at least landmark feature present within the garment segment data and for generating landmark data; and generating in response to the landmark data two-dimensional garment pattern data.

The method of the present invention also includes, when determining with the material determination unit, applying to the garment related data a semantic segmentation technique to generate one or more texture maps associated with the garment, and extracting from the garment textual data one or more fabric parameters associated with a fabric of the garment. The texture maps and the fabric parameters can form part of the virtual garment data.

According to one embodiment of the present invention, the method can include, when generating with the simulation engine, providing a tailor unit for receiving the virtual garment data and encoding the virtual garment data with the garment image data to form encoded garment data, providing a solver unit for receiving the encoded garment data and generating based thereon the simulated garment data, and feeding back the simulated garment data to the tailor unit for further processing thereby. According to another embodiment, the method can include, when generating with the simulation engine, employing a one shot network for receiving the virtual garment data and the avatar data and for generating based thereon the simulated garment data.

According to still another embodiment, the method of the present invention an include, when generating with the simulation engine, encoding with a tailor unit the virtual garment data with the garment image data to form encoded garment data, providing a graph network configured for receiving the encoded garment data and for generating garment related training data, and providing a one-shot network configured for receiving the garment related training data in order to train the one-shot network. The one-shot network is configured for receiving the virtual garment data and the avatar data and for generating based thereon the simulated garment data. A feedback loop can be provided for feeding back the garment related training data to the tailor unit for further processing thereby.

The method of the present invention can also include, when generating with the avatar generation unit, generating silhouette image data in response to receiving the user image data, and applying, in response to receiving the silhouette image data and the user biometric data, one or more machine learning models to generate the avatar. The machine learning model can include a deep learning regression model, and the method can include generating a plurality of measurements forming part of the avatar related data by employing a learned mapping technique by mapping between a predefined human silhouette and a plurality of body measurements of the user, and applies a statistical anthropomorphic analysis technique to the user biometric data.

The method of the present invention can also include generating with a fit analysis unit, in response to receiving the virtual garment data and the avatar data, garment fit data indicative of a fit of the virtual garment draped on the avatar. The virtual garment data is indicative of a virtual garment, and the method can also include segmenting the virtual garment into a plurality of garment segments, classifying each of the plurality of segments into one or more garment related categories, and generating the garment fit data based on the one or more garment related categories. The texture map can be indicative of the fit of the garment on the avatar.

BRIEF DESCRIPTION OF THE DRAWINGS

These and other features and advantages of the present invention will be more fully understood by reference to the following detailed description in conjunction with the attached drawings in which like reference numerals refer to like elements throughout the different views. The drawings illustrate principals of the invention and, although not to scale, show relative dimensions.

DETAILED DESCRIPTION OF THE INVENTION

As used herein, the term "avatar" is intended to include a virtual or digital image, representation or embodiment of an article, object, person, character, and the like. In the system of the present invention, the avatar can include a representation of a person, such as the end user. The avatar can also be considered as a dataset representing the user's appearance.

As used herein, the term "garment" is intended to include a wearable item or any selected type or article of clothing or apparel, of any size, shape, color, material, and the like.

As used herein, the term "virtual garment" is intended to include the data required to obtain a computational representation of the garment.

As used herein, the term "garment pattern" represents a two-dimensional (2D) shape made of vertices, curves and lines. The garment pattern can be used as guidance to cut pieces from a sheet of fabric, which can then be sewn to other parts to create the final garment.

As used herein, the term "drape" is intended to mean a garment that is overlayed, draped, cover, placed on or around a user or an avatar of the user.

As used herein, the term "render" or "rendering" or "rendered" is intended to mean generating a photorealistic or non-photorealistic image of an object from a two-dimensional or a three-dimensional model by adding, subtracting or manipulating one or more of color, light, shading, reflection, transparency, translucency, refraction, diffraction, texture, bump mapping, and depth of field associated with the model, as well as by selecting or manipulating the geometry or viewpoint of the object, in order to produce a photorealistic image or representation of the object.

As used herein, the term "fit" or "garment fit" is intended to mean a measure or analysis or determination of how well a garment's measurements relate to the body measurements of the user avatar. The fit can also include different types of fits, such as a tailored fit where the garment skims the contours of the wearer's body, a body con fit where the garment conforms to the body of the wearer, and an oversized fit where the fit is roomier than the tailored fit. The fit is also related to the type of virtual garment being analyzed. For example, a blouse, shirt or blazer is intended to fit differently than outerwear, such as a coat or a jacket.

Figure 1:
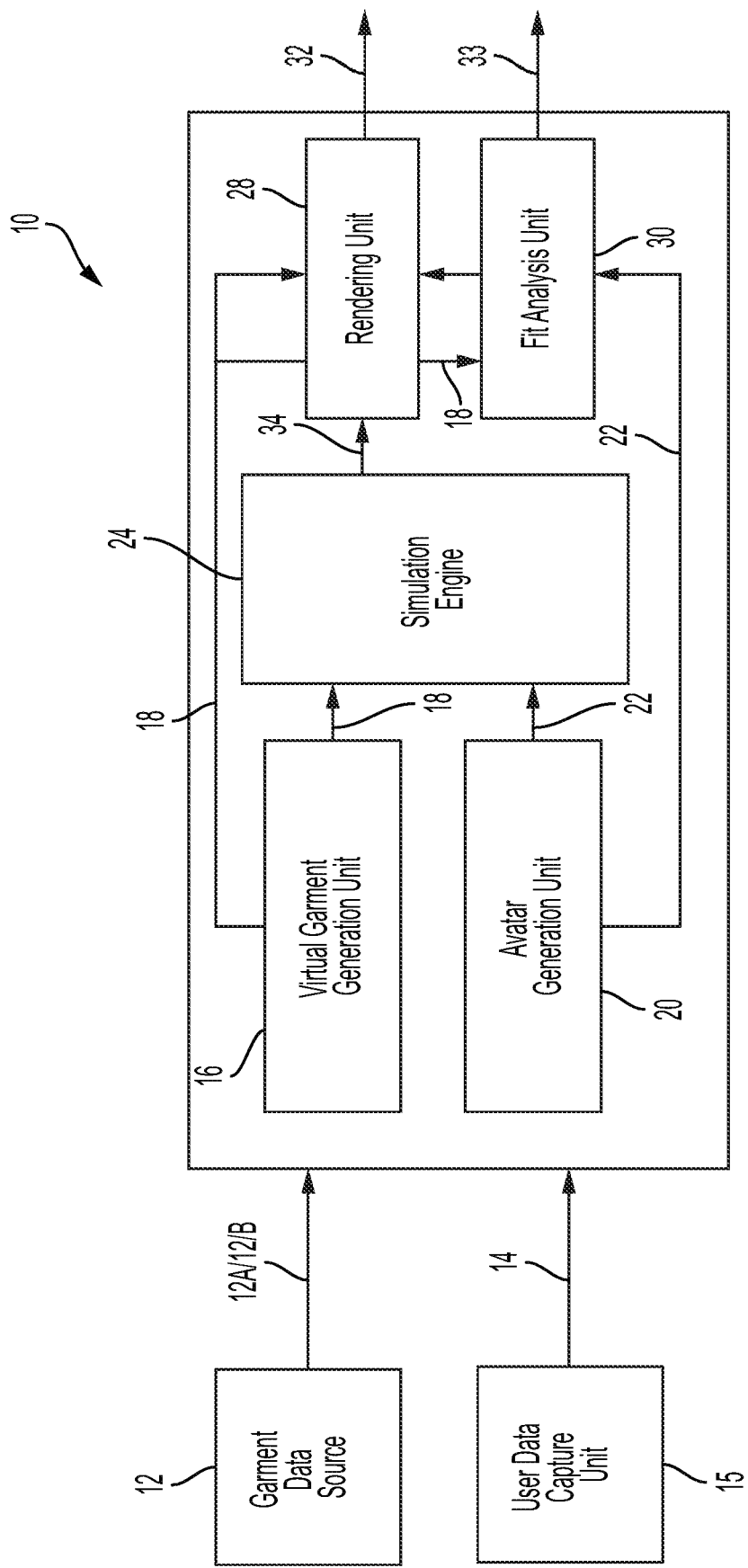
FIG. 1 is a schematic block diagram of the garment rendering system according to the teachings of the present invention.

The garment rendering system of the present invention is shown for example in FIG. 1. The garment rendering system can functions as a Virtual Try-On and Size Recommendation (VTON+SR) system. The illustrated garment rendering system 10 is configured to receive any selected type of data from one or more garment related data sources 12, including garment related data, such as garment image data 12A and garment text or textual data 12B. The input garment related data 12 can include any selected type of garment data, from any selected type of input garment data source, including but not limited to any combination of garment related technical packs, garment Computer-Aided Design (CAD) files such as DXF or CLO, three-dimensional scans of a garment, garment image data, textual description of a garment, and the like. The garment related data can include images of garments and associated textual information, including for example one or more of size, color, material or fabric composition, texture, weight, expected fit, garment details and features, and the like. The images of the garments can be provided in any selected file format, such as for example as CAD files. The CAD files can include two-dimensional or three-dimensional images or representations of the garments. The images of the garments can also or alternatively be provided in standard image formats, such as a joint photographic expert group (JPEG) format, a portable network graphic (PNG) format, and the like.

The user data 14 can include any selected type of information associated with or that represents the body of the user. The garment rendering system 10 is configured to work with any selected type of user data. The user data 14 can include for example image data of the user as well as biometric data of the user. The biometric data can include, for example, data associated with the height, weight, waist size, any selected type or set of tape measurements of the user's body, garment size information, age, body dimensions and contours, body type and construction, and information regarding the sizes the user wears in any selected brand of clothing. The user image data can be a photographic image supplied by the user to the system 10. For example, the image data can include images (e.g., color or black and white), depth images (e.g., using laser imaging, detection, and ranging (LIDAR), time of flight, stereovision, and the like), as well as millimeter wave images.

The garment rendering system 10 can optionally include a user data capture unit 15 that can be configured to capture the user data. The user data capture unit 15 can include any selected subsystem that provides user image and biometric data. The user data capture unit 15 can be configured to guide the user to input the user data, such as images of the user, biometric data of the user, and information regarding the sizes the user wears in any brand of clothing. According to one embodiment, the user data capture unit 15 can be any combination of hardware and software that is capable of guiding the user to pose in one or more poses so that the avatar generation unit 20 can produce the an accurate user avatar. The user data capture unit 15 can include one or more selected user interfaces that allows the user to input biometric data, such as height and weight, and can provide and display a survey that the user can respond to regarding the sizes the user wears in any clothing brand. Additionally, the user data capture unit 15 can guide the user through a process of capturing body images (e.g., color images, depth images, millimeter wave images, etc.) that can be used to obtain body measurements, through one or more of textual, sound, video, and image instructions.

The user data capture unit 15 can employ one or more machine learning models to detect when the user is in the best pose for the avatar generation unit 20 and employ the methods to automatically capture the image of the user when the user is in an optimal position. Examples of suitable machine learning techniques that can be employed by the user data capture unit 15 include MeasureTalk, 3DLook, Sizer, The Fit, Mirrorsize, NetVirta, and the like. The user data capture unit 15 can also automatically capture the biometric data from the user through connected biometric sensors, such as scales, biometric impedance analysis, and the like. The input garment data 12 and user data 14 thus form two input datasets of the overall system 10. The first dataset is related to a physical garment (e.g., garment data 12) and the other dataset is related to the body of the user (e.g., user data 14).

The garment rendering system 10 can also include a virtual garment generation unit 16 for receiving the garment related data 12, such as the garment image data 12A associated with the garment, and then processes the garment image data 12A to generate a virtual garment and associated virtual garment data 18. The virtual garment generation unit 16 can also process the garment textual information 12B to determine information associated with the garment, such as fabric or material information or characteristics, including stiffness, material type, bending resistance, color, and the like. The processed textual information can form part of the virtual garment data 18. The virtual garment data 18 can be a 2D or a 3D virtual representation of the garment. The virtual garment 18 can include datasets that can be processed for the subsequent simulation and rendering of the garments. The virtual garment data 18 can include any selected type of data, including any combination of two-dimensional polygons representing garment patterns, garment images that provide visual details such as prints, textures, look and feel, refraction to light, and the like, fabric or material property data suitable for simulation such as weight, density, stiffness, and the like of the material in the real garment, and fitting information such as a list of sizes (e.g., small, medium, large, extra-large, and the like) and dimensions for each of the listed sizes, such as circumference at the waist, size of the chest area, and the like. The virtual garment data 18 can be conveyed to one or more of the simulation engine 24, the rendering unit 28 and the fit analysis unit 30. According to one embodiment, the virtual garment data 18 can be conveyed to and processed by the simulation engine 24 and can also be conveyed to and processed by the rendering unit 28. The simulation engine 24 can use the virtual garment data 18 (e.g., garment dataset) to simulate how the garment fits or drapes on a user's body. The rendering unit 28 can use the virtual garment data 18 to render the garment by, for example, adding color and texture to the garment when draped on the avatar to create a photorealistic image. Finally, the fit analysis unit 30 can use the virtual garment data 18 to recommend an optimal or proper size of the garment for the user by generating a size recommendation.

The illustrated system 10 also includes an avatar generation unit 20 for receiving and processing the user image data from the user data 14 generated by the user data capture unit 15 and for generating therefrom an avatar and associated avatar related data 22. The user image data can include for example images of the user, such as for example the front and side views, as well as images of other user views and positions. The biometric data can be used, in addition to the image data, to generate the avatar. The avatar can be generated based on the user input data 14 using one or more selected methods or techniques. The user data 14 can further include garment sizing information, including garment sizes in other known brands. The avatar related data 22 generated by the avatar generation unit 20 can be highly reflective or can highly simulate the body measurements of the end user and can be used to virtually "try on" selected garments. That is, the virtual garment can be draped on the avatar.

According to one embodiment, the avatar related data 22 generated by the avatar generation unit 20 can include a three-dimensional mesh indicative of a human shape along with a set of body measurements. The 3D mesh can have a direct correspondence with the user's measurements. That is, the avatar generation unit 20 can generate the mesh from the user measurements or vice versa. The 3D mesh can be to scale with the actual user measurements. Hence, when the simulation engine 24 receives the 3D mesh data, the body measurements can be obtained by directly measuring the mesh. When given the user related measurements, the avatar generation unit 20 can generate the 3D mesh using any existing human-shape modelling technique, such as a Sparse Trained Articulated human body Regressor (STAR), Skinned Multi-Person Linear Model (SMPL), Shape Completion and Animation for People (SCAPE), and the like. Specifically, the avatar generation unit 20 can generate an avatar 22 that highly simulates the body measurements of the user and can be used to virtually "try on" selected garments. As described, the user data 14 can include any combination of images representing the user, biometric data, and information about the user size in known brands. Because of the diversity in the input user data, the avatar generation unit 20 can generate the avatar using multiple different methods or techniques. According to a first method or technique, when only biometric data is available, the avatar generation unit 20 can employ a statistical anthropomorphic analysis technique to infer a full body measurement set from a smaller set (e.g., 3-6 measurements) of body measurements. This can be achieved by using a multivariable optimization method taking as input the parameters one or more of the foregoing human-shape model techniques, such as STAR, SMPL, SCAPE, and the like, and modifying the human-shape model parameters until the model produces a shape that abides to the measurements given by the user. Then, the rest of the body measurements can be inferred from the obtained shape, as well as from known correlations between human proportions.

Figure 8:
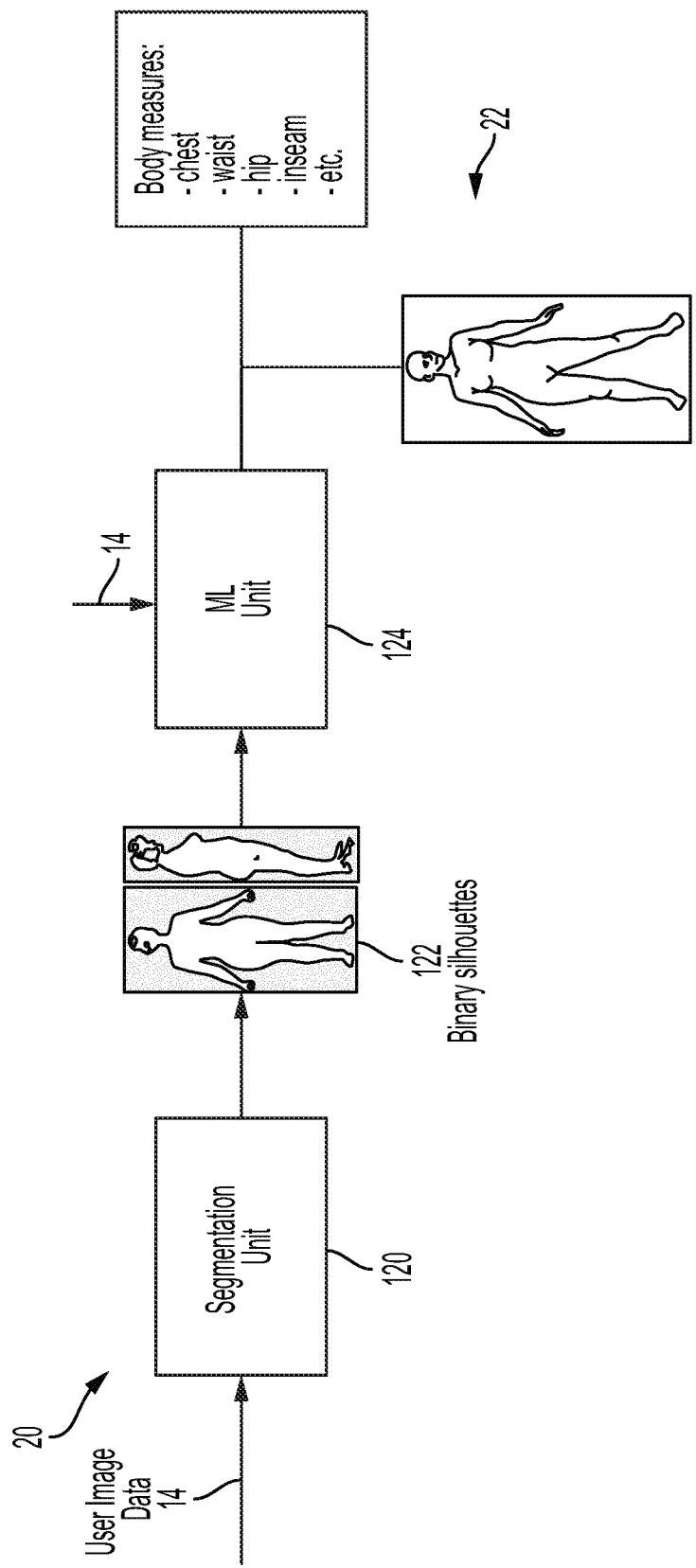
FIG. 8 is a schematic block diagram illustration of the avatar generation unit of the system of the present invention.

According to a second method or technique, when user images and the height and weight of the user are available, the avatar generation unit 20 of the present invention uses the technique shown for example in FIG. 8. The avatar generation unit 20 can include a segmentation unit 120 can be configured to receive the user related data 14, including the user image data. The segmentation unit 120 can be configured to process any type of image data, including any number of different views of the user, and preferably receives and processes a front image view and a side image view of the user. The segmentation unit 120 processes the input data and generates silhouette image data, such as for example binary silhouette image data. For example, the segmentation unit generates a binary mask 122 where the white pixels in the image represent the body of the user and the black pixels represent the background, creating a silhouette of the user. The binary mask data 122 is introduced to a machine learning unit 124, along with selected user related data 14, including biometric data (e.g., height and weight). The machine learning unit 124 can apply, for example, a deep learning regression model to the input data. The machine learning unit 124 can generate a set of body based measurements for the avatar related data 22 using a learned mapping technique by mapping between a predefined human silhouette and the body measurements of the user. Finally, the avatar mesh is obtained from the measurements using the previously described first method. As mentioned, the body measurement data can include any data associated with the measurements or dimensions of the user, including chest size, waist size, hip size, inseam length, and the like. The body measurement data can be employed by the avatar generation unit 20 or by the simulation engine 24 for making garment size recommendations to the user.

According to a third method or technique, when only sizing information of the garments in other brands is available as part of the user data 14, the avatar generation unit 20 can match the user to an archetype avatar that can wear all the sizes provided by the user. For example if the user states that she wears size small (S) in Acme tops and size 28 in Levi jeans, then the avatar generation unit 20 can generate an avatar that can also wear the indicated garments.

According to a fourth method or technique, when any given combination of image data, body measurements and sizes the user can wear are provided, the avatar generation unit 20 works as follows. If the images are given, then the body measurements are obtained using the foregoing second method. If biometric data is entered without images, then the first method is employed. If both images and biometric data are provided (i.e. images of the user and a waist measurement), the biometric data entered is preferred over the estimations of the machine learning unit 124. If garment sizes are also provided, the measurements are clipped to match the garment size. Specifically, by way of example, if the user wears a size "small" then the avatar generation unit 20 infers that the user chest is thirty inches. If the existing measurements are indicated to be thirty-one inches, then the measurements are corrected to thirty inches. However, if the estimation is twenty-nine inches, then the estimations are left untouched as they conform to a size "small."

The garment rendering system 10 can also include a simulation engine 24 for receiving user selection information, as well as the virtual garment data 18 and the avatar related data 22. The user selection information can include, for example, a selection or indication by the user of a particular garment to view. The virtual garment data 18 can be generated prior to the selection and stored in the system or can be generated by the virtual garment generation unit 16 in real time upon selection by the user based on the garment related data. The simulation engine 24 can drape the virtual garment on the avatar. Specifically, the simulation engine 24 generates a simulation or a simulated garment data 34 that represents how the physical garment looks and drapes on the user's body or avatar 22. As such, the simulation engine employs the avatar related data 22 and the virtual garment data 18. According to the present invention, the simulation engine 24 can overlay one or more virtual garments 18 on the user avatar.

The system 10 also includes a rendering unit 28 for rendering the avatar data 22 and the virtual garment data 18 via any suitable software application for display on a suitable display device. The rendering unit 28 receives the virtual garment data 18 and the simulated garment data 34 and processes the data to add one or more display or rendering characteristics for enhancing visual realism, such as color, light, texture, and the like, to produce a photorealistic rendered virtual image 32 of the user wearing the simulated garment 34. The rendered virtual image and associated data 32 can be displayed to the end user on a display device. The display device can form part of the system 10, such as for example by forming part of the rendering unit 28, or can be a display device disposed at the user end and hence does not form part of the system 10. The simulation engine 24 and the rendering unit 28 can function as a virtual try-on tool or component of the system. The virtual try-on tool virtually simulates the "wearing" of the garment by the user by overlaying or draping the virtual garment on the user's avatar. This enables the user to determine the overall fit of the garment on the user by assessing the fit of the virtual garment on the avatar. The virtual try-on tool hence delivers custom fit and sizing visualizations to the user.

In order to provide a believable visual representation of a garment being worn by a user avatar, the rendering unit 28 of the system 10 of the present invention needs to generate a photorealistic image render of the garment fabric and provide a photorealistic render of the user. Rendering fabric is challenging since fabrics can feature complicated patterns of light diffusion, which are determined by the structure of the yarn composing the garment. According to one embodiment, the rendering unit 28 can employ a Physically Based Rendering (PBR) technique to generate a suitable rendered virtual image. Other suitable techniques can include yarn-level raytracing techniques, which can be employed to provide a realistic image render. Additionally, human skin can be considered to be a material that also shares a complex light diffusion pattern. According to still yet another embodiment, the rendering unit 28 can employ a trained network to map the PBR 3D renderings of a garment into high quality, yarn-level Raytracing of the same garment in order to increase the visual quality of the rendered fabric. The network can be trained offline with a generated dataset of Raytracing and PBR images, so as to translate PBR real-time generated images into high quality ones. Further, to obtain a photorealistic avatar, the rendering unit 28 can render the avatar's body in 3D to obtain the best match possible between the fabric wrinkles and the underlying avatar. The system can then post-process the skin with a similar approach to the one used for fabrics (e.g., mapping fast PBR renders into high quality Raytraces). In a final step, the system can map photorealistic faces into solid color markers in the avatar's body. Particular attention can be given to the neckline area, as this region is important such that the GAN generated face matches the body.

The garment rendering system 10 can also include a fit analysis unit 30 for assessing or analyzing the general fit of the virtual garment 18 when draped on the avatar 22. The fit analysis unit 30 processes the avatar data 22 and the virtual garment data 18 and generates garment fit related data 33 representative of a size recommendation, which recommends a size of the garment that optimally fits the user. Then, for each of the sizes of the garment (e.g., small, medium, large, X-large, and the like), the fit analysis unit 30 generates fit related data indicative of an analysis of how the garment fits the user. For example, the fit analysis unit 30 is configured to divide or segment the virtual garment into selected parts or segments of interest. For example, shirts can be divided into a neckline part, a shoulder line part, a chest line part, and a waist line part, while pants can be divided into a pant line part, a crotch part, a hip part, and an inseam part. The parts of interest are unique for each garment, but they can be reused across similar garment categories. Then, for each part of interest of each garment size, the fit analysis unit 30 can classify each garment part into one or more garment related categories or classifications. For example, the categories can be associated with garment type, garment fit, and the like. For example, the fit analysis unit can classify the segments into fit categories, such as "very tight", "tight", "snug", "loose" and "very loose." The classifications and associated designations can vary according to different embodiments of the present invention. The classifications can be obtained by performing a numerical analysis, including simulations of how the body of the user fills the space inside the garment, taking into consideration both the design, the type and the materials of the garment. For example, spandex legging is supposed to stretch considerably, while work pants made of cotton are supposed to be worn loosely all around the body. According to another example, a blouse, shirt or blazer is intended to fit differently than outerwear, such as a coat or a jacket.

Figure 9:
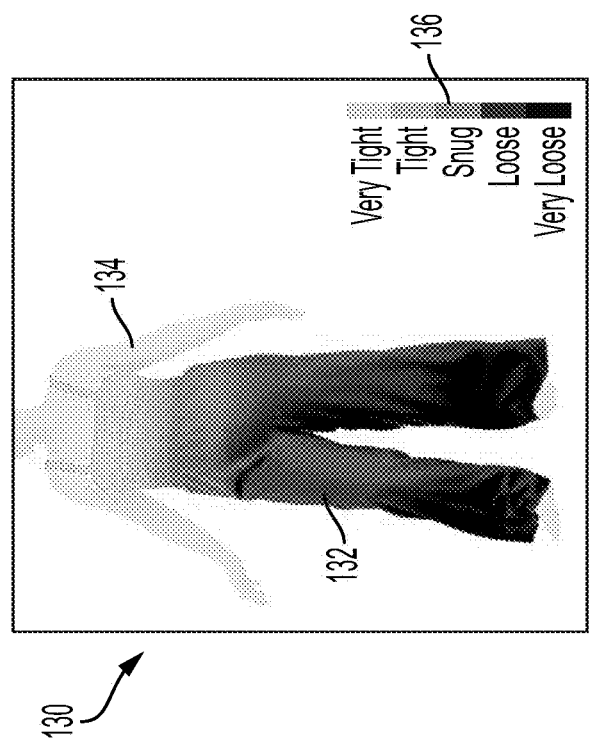
FIG. 9 is an example of the output produced by the fit analysis unit of FIG. 1 according to teachings of the present invention.

Once the fit analysis is completed by the fit analysis unit 30, the user is presented with garment size recommendation data 33. The garment size recommendation 33 can take either textual form or visual form. An example of the textual report can include textual description of the fit, such as "For the Size Small of the Stripped Shirt, you will feel snug on the chest area, while the waist area will be loose". The textual report can also be a simpler recommendation such as "we recommend size Medium for you". Meanwhile, the garment size recommendation 33 can include a visual report. The visual report can include an image, such as the image shown in FIG. 9. The illustrated fit image 130 can show a garment 132 draped or fitted on top of the avatar 134. However, instead of adding visual realism, the garment can be colored or textured based on various fit categories 136 employed by the fit analysis unit 30. The fit categories are similar to a texture map that illustrates or depicts, in any suitable visual form, the relative fit of selected areas of the garment on the avatar. For example, the regions that are looser in fit can be colored or shaded differently than the areas or regions that are less loose or are a tighter fit. The fit map can also be divided into zones or areas of selected sizes, such that they clearly covey suitable information to the end user, such as the arm areas, the chest area, the mid-section area, and the like. In FIG. 9, based on the fit categories 136, for the particular garment size the user can expect a very tight fit around the chest area, snug on the waist and loose and very loose around the legs.

The illustrated garment rendering system 10 can employ one or more processors or controllers for processing the various types of data. The system can also include and employ suitable storage and memory. According to one embodiment, those of ordinary skill in the art will readily recognize that one or more of the illustrated virtual garment generation unit 16, the avatar generation unit 20, the simulation engine 24, and the rendering unit 28 can include one or more processors or controllers (e.g., CPUs), storage and memory.

The garment rendering system 10 of the present invention is configured to allow a user to select a garment, input selected user information including body measurements and the like, generate a virtual avatar, and then place or overlay an image of the garment (virtual garment) on the avatar. The virtual garment generation unit 16 generates the virtual garment and then the simulation engine can be configured to overlay the virtual garment on the user avatar. This process is referred to herein as the virtual try-on feature of the present invention. The virtual try-on feature addresses scalability issues of conventional systems. Specifically, the virtual try-on feature can simulate 2D or 3D outfits (more than one garment) for a number of different users, concurrently, in real time, while considering fit (i.e., telling the user the areas where garments feels loose or tight). Conventional virtual try-on systems are either incapable of providing full outfits (trying on more than one garment at a time—for example a shirt and a pair of pants) in real-time or are incapable of accounting for fit.

The details of the virtual garment generation unit 16 of the present invention is schematically shown for example in FIGS. 2-6. With specific reference to FIGS. 2 and 5, the illustrated virtual garment generation unit 16 can include a pattern determination unit 40 that is configured to receive garment image data 12A and garment textual data 12B and to generate garment pattern data 42 based on the garment image and the garment textual data. The garment pattern data 42 can be, for example, 2D garment pattern data. The garment pattern data 42 is then received by a mesher unit 44. The mesher unit 44 processes the garment pattern data 42 and generates based thereon three-dimensional garment meshes 45 that are indicative of the garment and thus form at least part of the virtual garment data 18. The mesher unit 44 can employ one or more meshing techniques for subdividing the garment pattern data 42 into a series of geometric spaces or patterns, called meshes or mesh cells, that accurately depict the pattern of the garment. The meshes can form, according to one embodiment, a simplicial complex. The meshes are used as a discrete local approximations of each pattern in the garment. The garment meshes 45 are conveyed to the simulation engine 24 as part of the virtual garment data 18.

Figure 3:
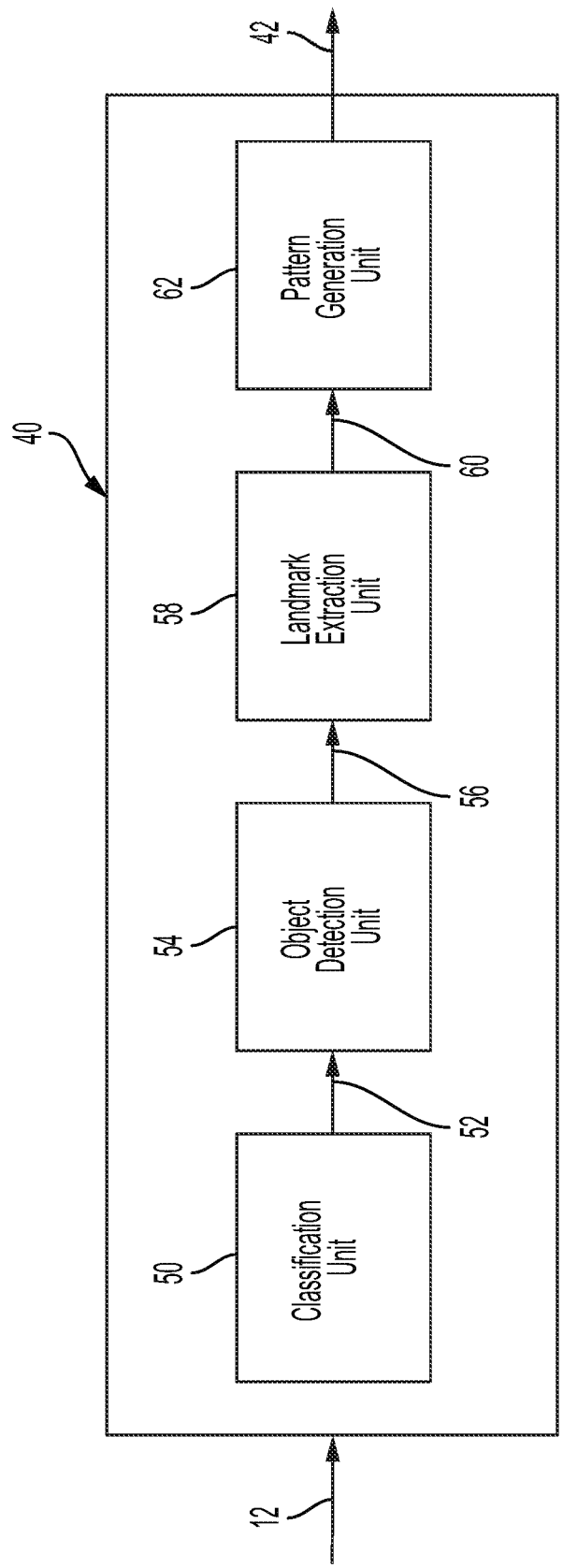
FIG. 3 is a schematic block diagram depiction of the pattern determination unit of FIG. 2 according to teachings of the present invention.
Figure 6:
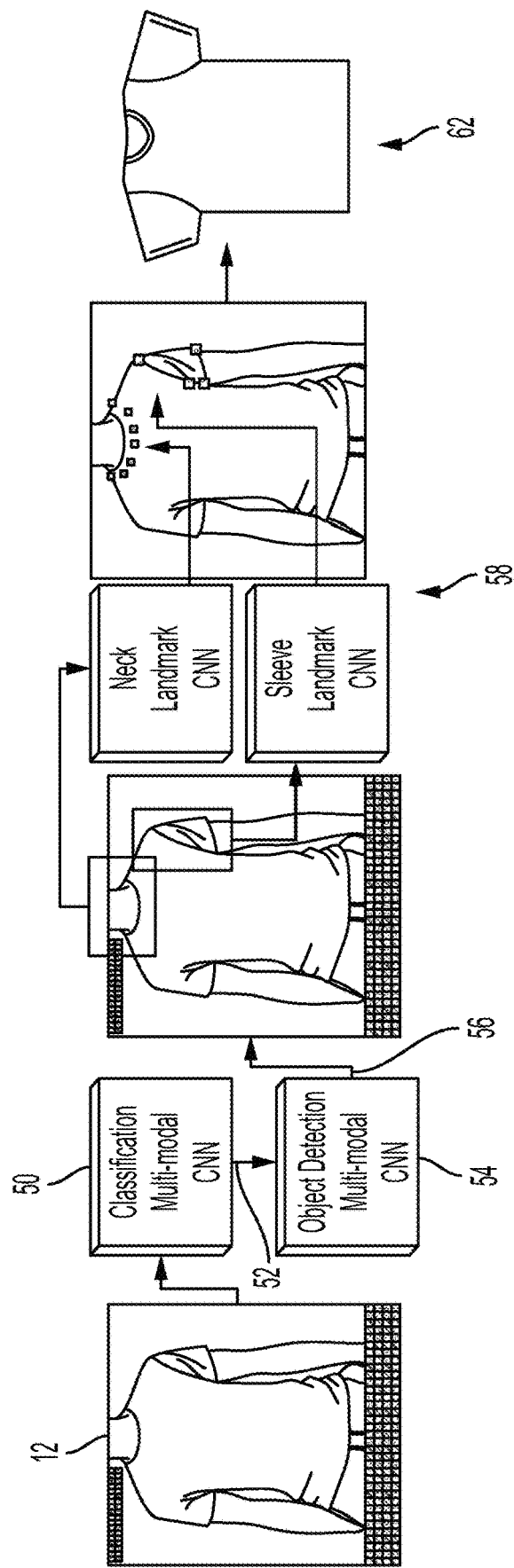
FIG. 6 is a schematic data flow diagram of the pattern determination unit of FIG. 3 according to teachings of the present invention.

The details of the pattern determination unit 50 are shown for example in FIGS. 3 and 6. The illustrated pattern determination unit 50 can include a classification unit 50 for classifying the garments into one or more garment related classes or categories based on the garment image data 12A and the garment textual data 12B (e.g., multimodal garment data). Specifically, the classification unit 50 can employ any suitable type of classification technique, such as a deep learning model technique, that is suitable for classifying the images and the textual data into classes indicative of different types of garments, such as t-shirts, dresses, trousers, shirts, blazers, coats, and the like. The deep learning model technique can be employed to associate a label or category with every pixel in an image, and can be further employed to recognize a collection of pixels to form distinct categories or classifications. The classification technique can also process different types of data (e.g., multimodal) including garment images and garment textual data. The garment textual data can be converted into one or more word vectors that are embedded in the garment image. According to one embodiment, the word vectors can be embedded in the garment image as a color array. The classification unit 50 then generates garment classification data 52 indicative of the word vectors in the garment image. An example of a suitable deep learning model that can be employed by the classification unit 50 can include a convolutional neural network (CNN) type model. Once the classification unit 50 classifies the garment, the virtual garment generation unit 16 determines the type of garment present in the garment data 12A and 12B.

Once the garment classification data 52 is obtained, the pattern determination unit 40 determines the parts present in the garment. To do so, the garment classification data 52 is received and processed by an object detection unit 54 for detecting one or more objects in the classification data. Specifically, the object detection unit 54 can employ one or more object detection techniques for detecting and extracting garment segments or parts from the garment classification data 52. For example, the object detection model detects selected garments parts or segments of each garment that has been classified. The segments that are identified correspond to the type of garment being processed. For example, if the garment is a shirt, then the garment segments include sleeves, necks, sides, and the like. Examples of suitable object detection models can include You Only Look Once (YOLO) such as YOLO 20, a convolutional neural network such as CenterNet ResNet-18 22, a deep neural network such as Inception 18 and Resnet-101 42, and the like. The object detection model employed by the object detection unit 54 can be trained using selected types of training data associated with various types of garments. According to one embodiment, the object detection unit 54 employs a single object detector that can be trained. According to another embodiment, the object detection unit 54 can employ multiple different object detectors. For example, the object detection unit 54 can employ an object detector for each type of garment. The intuition behind training separate object detectors for each garment type is that different garments have different parts or segments. The training of the object detectors can increase the robustness of the overall garment segment detection by removing segment types that are known not to be present in a particular garment (e.g., pant legs in a dress). This increases the ease of re-training as new classes of garments can be trained individually. The object detection unit then generates garment segment data 56.

The garment segment data 56 is then received and processed by a landmark extraction unit 58. The landmark extraction unit 58 can employ any selected prediction or detection technique for detecting and extracting specific landmark features that are present within the garment segment data 56 in order to characterize the visible part parameters, such as for example lengths and apertures, of the garment segments. The landmark features correspond to recognizable features in the garment segments. This is done to parametrize the parts obtained. For example, a neckline can be further parametrized into a crew neck, a v-neck, and the like. By simple way of example, when the garment is a shirt, the landmark extraction unit 58 can identify the neck aperture and the sleeve portions based on the identified garment segments. According to one embodiment, the landmark extraction unit 58 can employ one or more specific landmark predictors for each class of garment for ease of training, system robustness, and modularity. Also, landmark predictors can be reused entirely by different garment classes (i.e., dresses and t-shirts can both reuse a neck landmark predictor). Examples of suitable deep learning techniques and methods employed by the landmark extraction unit 58 can include JFNet 35 and DeepMark 44 type architectures. The landmark extraction unit 58 then generates landmark data 60 in response to the garment segment data.

The pattern determination unit 40 further includes a pattern generation unit 62. The pattern generation unit 62 receives and processes the landmark data 60 generated by the landmark extraction unit 58 and generates therefrom two-dimensional garment patterns and associated data 42. The pattern generation unit 62 predicts the landmarks in the garment segments by processing the detected garment segments and associated dimensions inferred from the spatial relationships of landmark features by employing a suitable deterministic pattern-making technique. According to one embodiment, the pattern making technique can employ a dictionary where keys correspond to the garment segment names and values are base polygons needed to represent a garment segment. The base polygons are modified based on the landmark spatial relations and assembled together based on the parts and garment type detected. The two-dimensional garment pattern data 42 generated by the pattern generation unit 62 is then processed by the mesher unit 44 to convert the base polygons in the garment pattern data into the three-dimensional garment meshes forming part of the virtual garment data 18.

Figure 2:
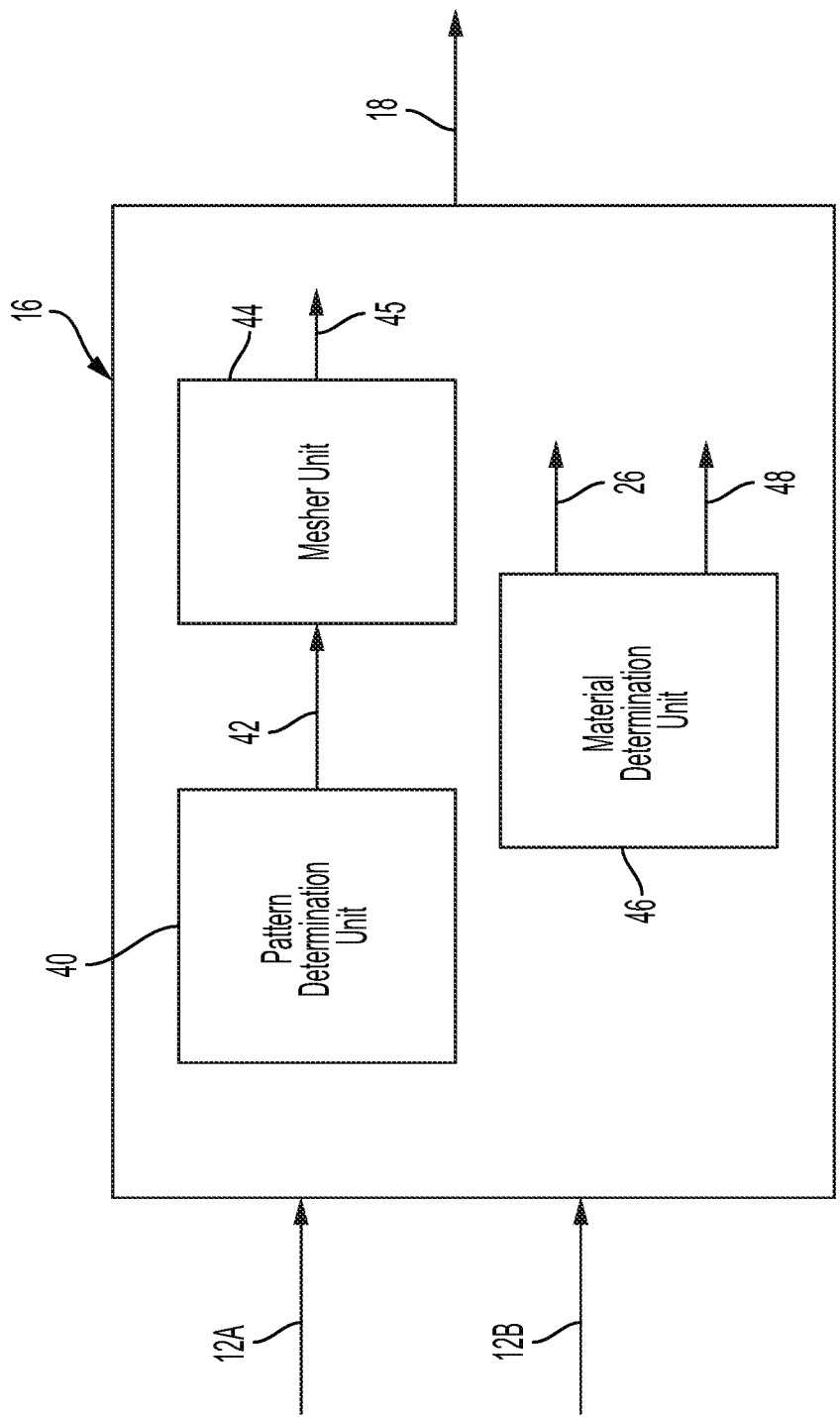
FIG. 2 is a schematic block diagram depiction of the virtual garment generation unit of the garment rendering system of FIG. 1 according to the teachings of the present invention.
Figure 4:
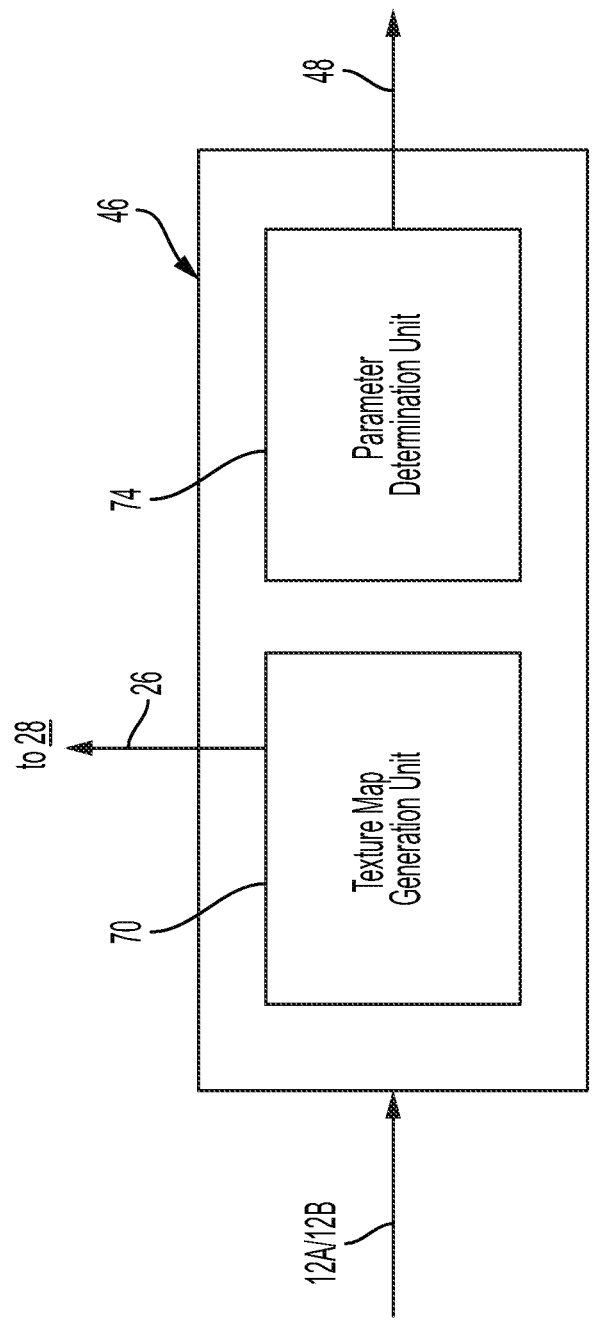
FIG. 4 is a schematic block diagram depiction of the material determination unit of FIG. 2 according to teachings of the present invention.
Figure 5:
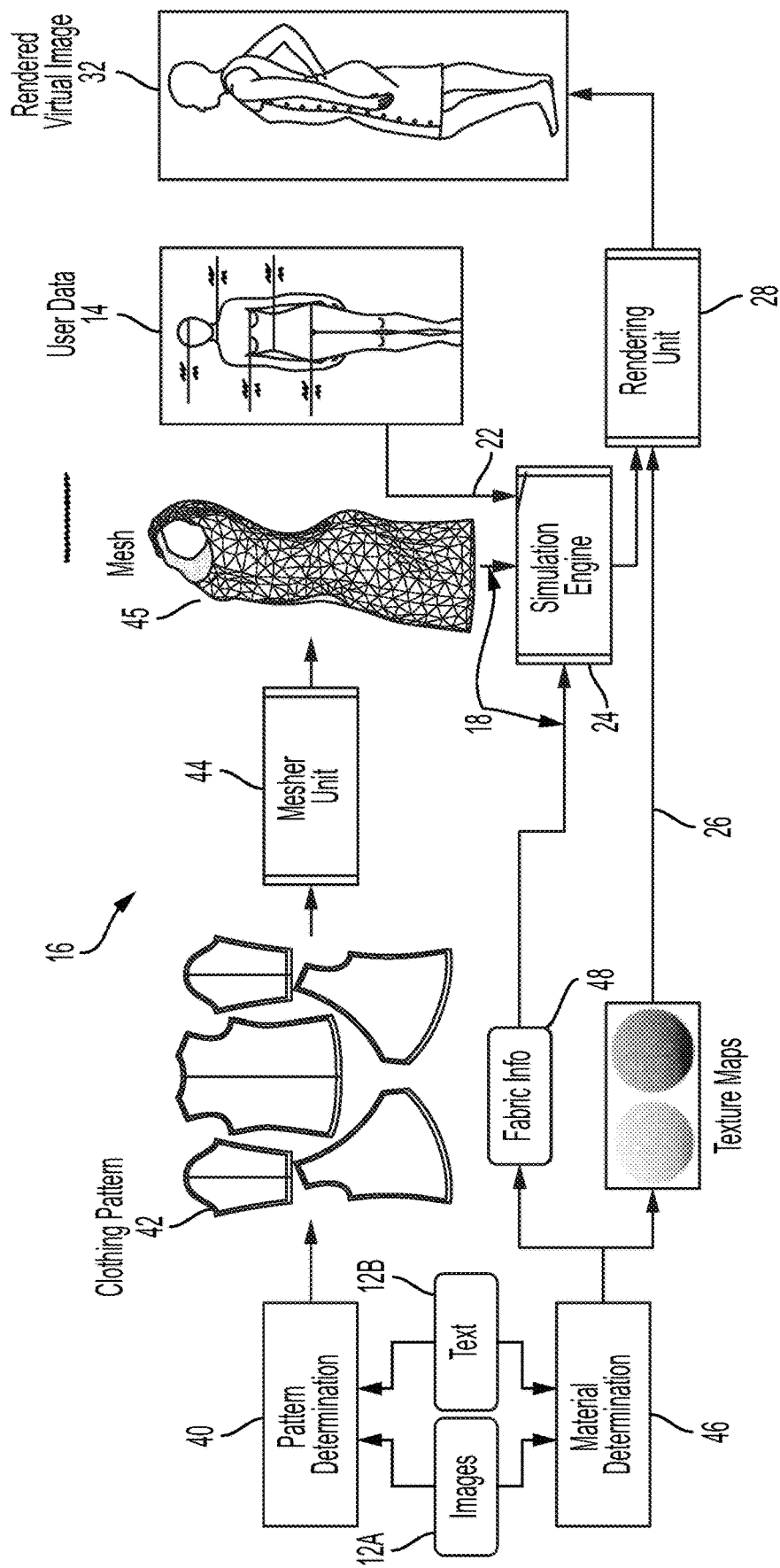
FIG. 5 is a schematic data flow diagram of the garment rendering system of FIG. 1 according to teachings of the present invention.

With reference to FIGS. 2 and 4, the virtual garment generation unit 16 can further include a material determination unit 46 for determining the type of material associated with the garment based on the garment image data 12A and the garment textual data 12B. The illustrated material determination unit 46 can generate texture maps and extract or determine fabric parameters associated with the types of fabric associated with the garment. Specifically, the material determination unit 46 can employ a texture map generation unit 70 that processes the garment related data and applies thereto a semantic segmentation technique to generate one or more texture maps 72 associated with the garment. The texture maps are essentially textures that are used by the rendering unit 28 and are applied to the surface of an object or an image to add realism and texture thereto.

The material determination unit 46 can also include a parameter determination unit 74 that receives the garment related data, such as the garment text data, and extracts therefrom or generates based thereon fabric parameters, such as elasticity, density, weight, and the like. According to one embodiment, the parameter determination unit 74 applies to the garment textual data a suitable machine learning technique, such as a natural language processing (NLP) technique, to obtain from the data fabric parameters 48, which are typically provided as part of the garment descriptions, and hence form part of the garment textual data 12B. By simple way of example, a description of a garment can be "made of cotton 80% and spandex 20%." The properties of the fabric are known and it is now possible to obtain the description using the NLP techniques to map the fabric onto the known simulation parameters.

The texture map data 26 is conveyed to and received by the rendering unit 28 as part of the virtual garment data 18 so as to add much-needed detail and the fabric parameters 48 can be conveyed to the simulation engine 24. The output of both the pattern determination unit 40 and the material determination unit 46 provides all of the garment data required by the simulation engine 24 to simulate the virtual garment. As such, the virtual garment generation unit 16 creates or generates a virtual garment (e.g., three-dimensional meshes 45) that is conveyed to the simulation engine 24, along with the fabric information or parameters 48, to simulate the virtual garment on the avatar (e.g., the avatar information 22). The simulated garment data 34 as well as the avatar data 22 and the virtual garment data 18 can be conveyed to the rendering unit 28, along with the texture map data 26 and the fabric information and parameters 48 (as part of the simulated garment data 18), to produce a final photorealistic image render of the garment and avatar. The virtual try-on tool of the present invention thus takes as inputs garment images 12A and garment textual data 12B describing and illustrating a selected garment, along with a set of user related body measurements (biometric data) and associated user image data to produce a final photorealistic image render of the garment and the avatar. The virtual try-on tool of the present invention thus takes as inputs garment images 12A and garment textual data 12B describing and illustrating a selected garment, along with a set of user related body measurements and associated user image data, to produce a photorealistic image of a user wearing the virtual garment. The virtual garment generation unit 16 employs a machine learning process that allows the use of garment images and garment textual data as inputs to the simulation engine, as opposed to prior art methods that require CAD files and/or 3D scanners for generating the input image data.

The virtual garments can hence be considered to be carefully constructed datasets required for the simulation and render of physical garments. The virtual garments include 3D meshes and images grouped together. The mesh encodes the material and the images encode the texture maps used by the rendering unit 28 to create a visual representation of the garment.

With reference to FIG. 1, the simulation engine 24 of the present invention is capable of generating multiple (e.g., hundreds) accurate three-dimensional virtual garment simulations per second for an overall selection of thousands of different garments. According to one embodiment of the present invention, the simulation engine 24 can accurately simulate cloth behavior in real-time, and is thus capable of generating, at a reasonable cost, hundreds of 3D accurate virtual garment simulations per second for a selection of thousands of different garments.

Figure 7A:
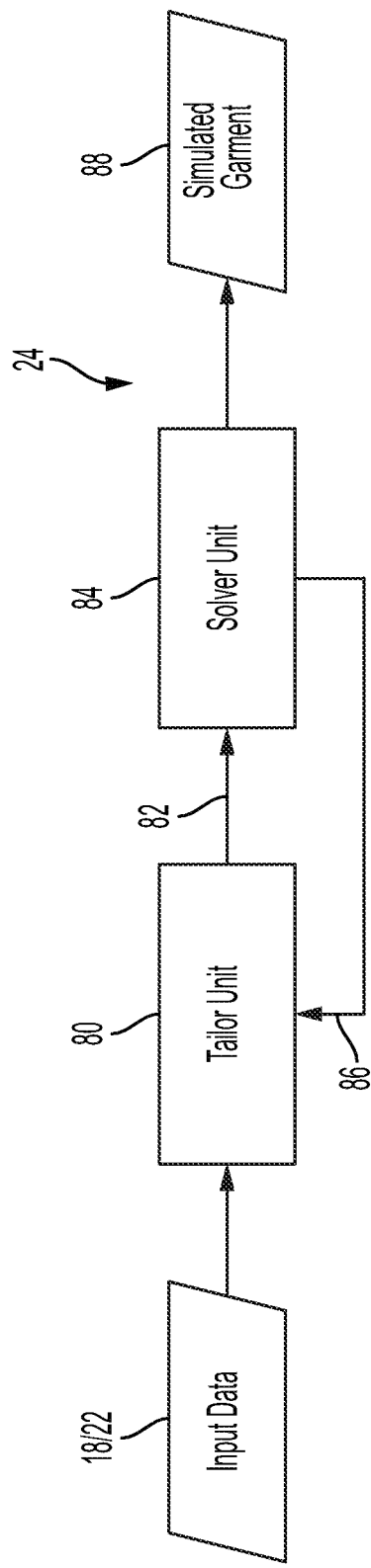
FIG. 7A is a schematic block diagram depiction of one embodiment of the simulation engine of FIG. 1 according to teachings of the present invention.

The specifics of one embodiment of the simulation engine 24 is shown schematically in FIG. 7A. The illustrated simulation engine 24 includes a tailor unit 80 and a solver unit 84. The solver unit 84 concerns only with the laws of physics (e.g., gravity, inertia, particles, tension, springs, etc.) and is independent of the type of garment being processed by the system. On the other hand, the tailor unit 80 processes the garment related parameters. The tailor unit 80 is thus configured to process garment related parameters, such as patterns, types of fabrics, draping, and the like. The tailor unit 80 translates the garment related parameters from the fashion domain into the physics simulation domain by generating selected input data structures that can be processed by the solver unit 84 to generate a desired output garment. The illustrated tailor unit 80 receives and processes input garment related data, which can include virtual garment data 18 and optionally avatar related data 22. The tailor unit 80 encodes the virtual garment data with the garment image data or with the avatar image data by converting the virtual garment data (and associated data structures) into a format suitable for a solver unit 84. The tailor unit 80 thus generates and outputs encoded garment data 82 (e.g., a dataset). The solver unit 84 receives and processes the encoded garment data 82 and generates therefrom a simulated or virtual garment 88. A feedback loop 86 can be employed so that the solver unit output (e.g., simulated garment and associated data 88) is fed back to the tailor unit 80 a selected number of times such that the solver unit 84 can generate an accurate, high quality simulated or virtual garment 88. The simulation engine 24 thus determines how the garment drapes (e.g., looks) on the avatar 22. Specifically, the solver unit 84 performs a simulation based on the encoded garment data 82 and either terminates the simulation based on a termination condition and generates the simulated garment 88 or feeds back the simulation results to the tailor unit 80 via feedback loop 86 so that the tailor unit 80 can direct the next simulation iteration by modifying the encoded garment data 82. The current simulation engine 24 does not employ (is free of) either numerical simulations or generative adversarial networks (GAN).

Figure 7B:
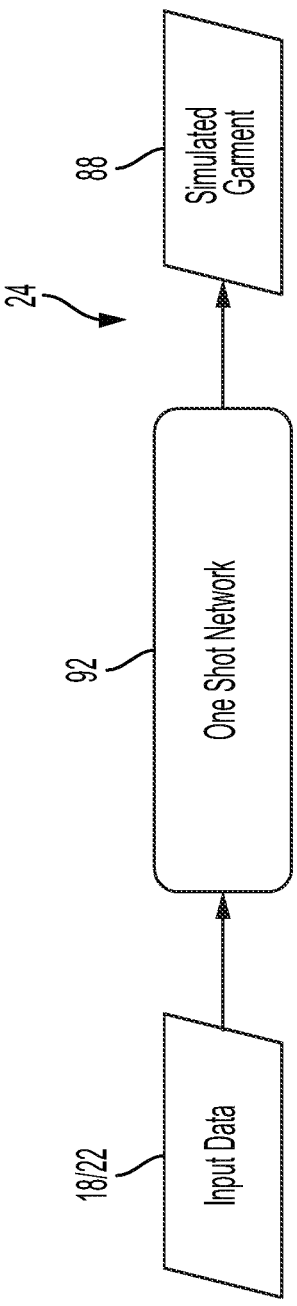
FIG. 7B is a schematic block diagram depiction of a second embodiment of the simulation engine of FIG. 1 according to teachings of the present invention.

According to another embodiment of the present invention, the tailor unit 80 and the solver unit 84 can be replaced by a machine learning unit, as shown for example in FIG. 7B. The illustrated machine learning unit can employ a one-shot network 92, which employs a deep learning technique, such as a convolutional neural network (CNN). The illustrated one-shot network 92 can be trained in a supervised manner via mapping the pre-simulated garment and the user body information into an already draped garment over the user body. To train the one-shot network 92, a large dataset of garments already draped on avatars present within the simulated garment data 34 are produced using any available method that can produce accurate results. During training, the one-shot network 92 is presented with the already draped garments and the virtual garment data 18 and the avatar data 22 required to produce them. As such, the one-shot network 92 can learn how to map from the data input (e.g., virtual garment data 12 and the avatar data 22) into an output (e.g., the already draped garment on top of the avatar), using a standard supervised learning process. Once the one-shot network 92 is trained, the network is capable of inferring the already draped garment on top of the avatar when given as input the virtual garment data 18 and the avatar data 22. This approach provides the required real-time simulation engine for the virtual try-on aspect of the present invention. Additionally, the entire simulation can be performed in a single pass and does not require multiple solver-tailor iterations, further reducing the time required to simulate the garment.

Figure 7C:
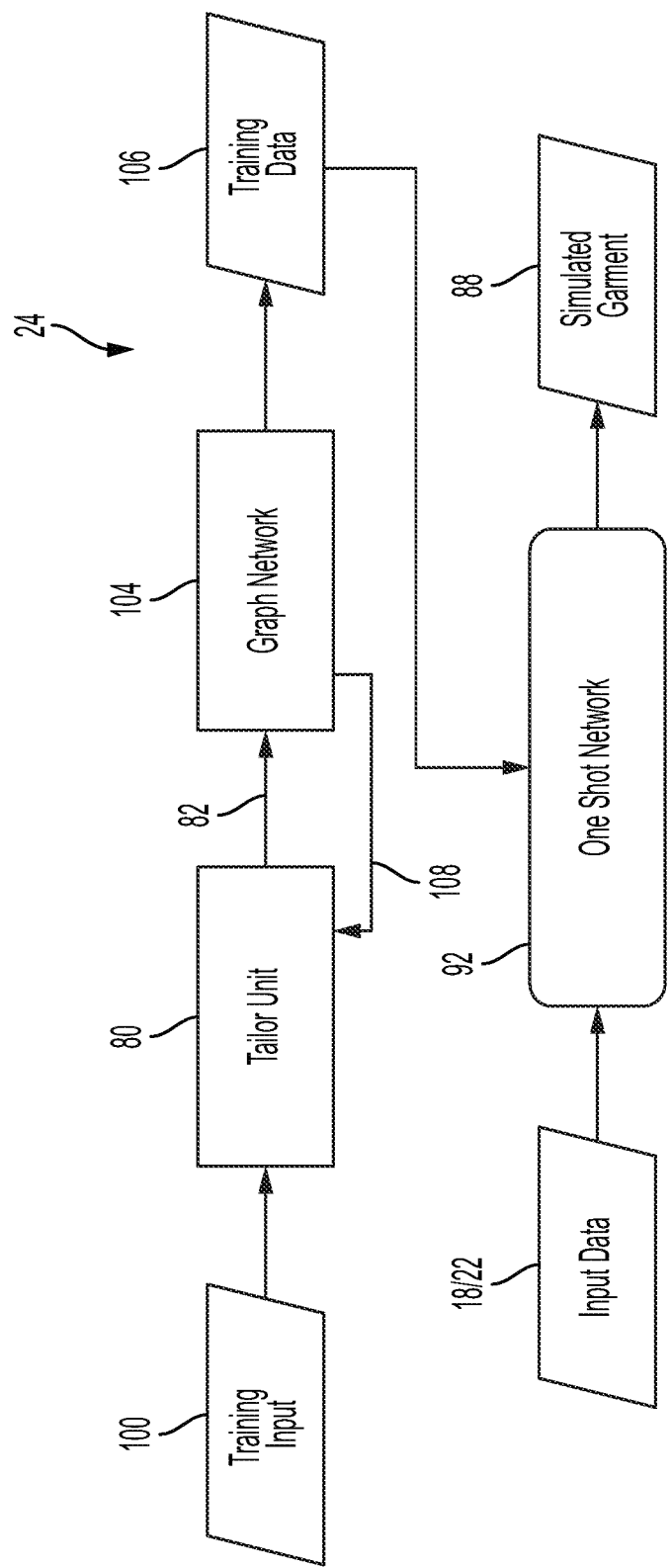
FIG. 7C is a schematic block diagram depiction of a third embodiment of the simulation engine of FIG. 1 according to teachings of the present invention.

In order to accelerate the training process of the machine learning technique employed by the one-shot network 92, the system 10 can produce the required training data using a partially accelerated network. The partial acceleration can be achieved by substituting the solver unit 84 of FIG. 7A with a specialty type of network called a Graph Network (GN), as shown for example in FIG. 7C. The graph network 104 learns how the solver works (i.e. the behavior of simpler objects such as particles and springs), hence it is faster and easier to train than the one-shot network 92. The trained graph network 104 can then operates along with the tailor unit 80, resulting in an improved or accelerated engine that while slower than the ones-shot network 92, is faster than traditional engines. The system 10 can then employ the partially accelerated simulation engine 24 to generate the required training data needed to train the one-shot network 92. Specifically, the training input data 100 can correspond to the garment related data 18 and to the avatar data 22. The training input data 100 is processed by the tailor unit 80 and generates the encoded garment data 82. The encoded garment data 82 is in turn received and processed by the graph network 104. The graph network 104 can employ a suitable machine learning technique, such as one or more graph neural networks (GNNs). The graph neural network converts the encoded garment data 82 into graph data, which can be used as training data to train the one-shot network 92. An advantage of graph networks is that the training need only be performed once, and then the trained network can be subsequently applied or used to carry out a number of different simulations, with a higher simplicity and speed than a ground truth physical simulator. The graph data can be used as training data 106 for the one shot network 92. The training data output of the graph network 104 can be fed back to the tailor unit 80 via a feedback loop 108. The training data 106 can be used to train the one-shot network 92. Once trained, the one shot network 92 receives and processes the input data 18, 22 and generates the simulated garment 88. The simulation engine 24 can thus generate the required garment data to train the one shot network 92 in a fraction of the time required using a non-accelerated engine. An advantage of the simulation engine constructed as such is that the engine can generate the required training data for the one shot network in a fraction of the time required using standard non-accelerated engines. Once trained, the trained one-shot network is then used to replace the binome of the tailor unit 80 and the solver unit 84 units in the simulation engine 24

Further, as noted above, the system 10 of the present invention can enable the end user to gauge the fit of selected garments. Conventional systems provide recommendations to the user about the garment size they should wear, which is impractical since the conventional system does not know how a given user wants to wear a garment (e.g., loose or fitted). Therefore, the system of the present invention can provide the user with information, via any suitable user interface, that allows the user to determine a desired fit. This can include employing a 3D map, such as a color map, indicating where on the user's body a garment is looser or tighter with suitable visual indicators. For example, a color red can indicate that the garment is very tight, the color yellow can indicate tight to the point that the garment is wearable but might be somewhat uncomfortable, the color green indicates that the garment is snug (not tight or loose), the color light blue can indicate that the garment loose, and the color dark blue can indicate that the garment is very loose. The color map (fit map) can be based on information provided from test users, hence including human perception, such as fabric stretch.

It is to be understood that although the present invention has been described above in terms of particular embodiments, the foregoing embodiments are provided as illustrative only, and do not limit or define the scope of the invention. Various other embodiments, including but not limited to those described herein are also within the scope of the claims. For example, elements, units, modules, engines, tools and components described herein may be further divided into additional components or joined together to form fewer components for performing the same functions.

Any of the functions disclosed herein may be implemented using means for performing those functions. Such means include, but are not limited to, any of the components, units or engines disclosed herein, such as the electronic or computing device components described herein.

The techniques described above and below may be implemented, for example, in hardware, one or more computer programs tangibly stored on one or more computer-readable media, firmware, or any combination thereof. The techniques described above may be implemented in one or more computer programs executing on (or executable by) a programmable computer or electronic device having any combination of any number of the following: a processor, a storage medium readable and/or writable by the processor (including, for example, volatile and non-volatile memory and/or storage elements), an input device, an output device, and a display. Program code may be applied to input entered using the input device to perform the functions described and to generate output using the output device.

The term computing device or electronic device as used herein can refer to any device that includes a processor and a computer-readable memory capable of storing computer-readable instructions, and in which the processor is capable of executing the computer-readable instructions in the memory. The terms computer system and computing system refer herein to a system containing one or more computing devices.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention may operate on digital electronic processes which can only be created, stored, modified, processed, and transmitted by computing devices and other electronic devices. Such embodiments, therefore, address problems which are inherently computer-related and solve such problems using computer technology in ways which cannot be solved manually or mentally by humans.

Any claims herein which affirmatively require a computer, an electronic device, a computing device, a processor, a memory, storage, or similar computer-related elements, are intended to require such elements, and should not be interpreted as if such elements are not present in or required by such claims. Such claims are not intended, and should not be interpreted, to cover methods and/or systems which lack the recited computer-related elements if such elements are recited. For example, any method claim herein which recites that the claimed method is performed by a computer, a processor, a memory, and/or similar computer-related element, is intended to encompass methods which are performed by the recited computer-related element(s). Such a method claim should not be interpreted, for example, to encompass a method that is performed mentally or by hand (e.g., using pencil and paper). Similarly, any product or computer readable medium claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Embodiments of the present invention solve one or more problems that are inherently rooted in computer technology. For example, embodiments of the present invention solve the problem of how to generate a virtual garment and an avatar of a user, and to overlay the virtual garment on the avatar. There is no analog to this problem in the non-computer environment, nor is there an analog to the solutions disclosed herein in the non-computer environment.

Furthermore, embodiments of the present invention represent improvements to computer and communication technology itself. For example, the system 10 of the present can optionally employ a specially programmed or special purpose computer in an improved computer system, which may, for example, be implemented within a single computing or electronic device.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements can also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

Exemplary Hardware

It should be appreciated that various concepts, systems and methods described above can be implemented in any number of ways, as the disclosed concepts are not limited to any particular manner of implementation or system configuration. Examples of specific implementations and applications are discussed below and shown in FIG. 10 primarily for illustrative purposes and for providing or describing the operating environment of the system of the present invention. The garment rendering system 10 and/or elements, units, or engines thereof can employ one or more electronic or computing devices, such as one or more servers, clients, computers, laptops, smartphones and the like, that are networked together or which are arranged so as to effectively communicate with each other. The network can be any type or form of network. The devices can be on the same network or on different networks. In some embodiments, the network system may include multiple, logically-grouped servers. In one of these embodiments, the logical group of servers may be referred to as a server farm or a machine farm. In another of these embodiments, the servers may be geographically dispersed. The electronic devices can communicate through wired connections or through wireless connections. The clients can also be generally referred to as local machines, clients, client nodes, client machines, client computers, client devices, endpoints, or endpoint nodes. The servers can also be referred to herein as servers, server nodes, or remote machines. In some embodiments, a client has the capacity to function as both a client or client node seeking access to resources provided by a server or server node and as a server providing access to hosted resources for other clients. The clients can be any suitable electronic or computing device, including for example, a computer, a server, a smartphone, a smart electronic pad, a portable computer, and the like, such as the illustrated electronic or computing device 300. The system 10 or any associated units or components of the system 10 can employ one or more of the illustrated computing devices and can form a computing system. Further, the server may be a file server, application server, web server, proxy server, appliance, network appliance, gateway, gateway server, virtualization server, deployment server, SSL VPN server, or firewall, or any other suitable electronic or computing device, such as the electronic device 300. In one embodiment, the server may be referred to as a remote machine or a node. In another embodiment, a plurality of nodes may be in the path between any two communicating servers or clients. The garment rendering system 10 which includes the virtual garment generation unit 16, the avatar generation unit 20, the simulation engine 24, the rendering unit 28, and the fit analysis unit 30 can be stored on or implemented by one or more of the electronic devices described herein (e.g., clients or servers), and the hardware associated with the electronic devices, such as the processor or CPU and memory described below.

Figure 10:
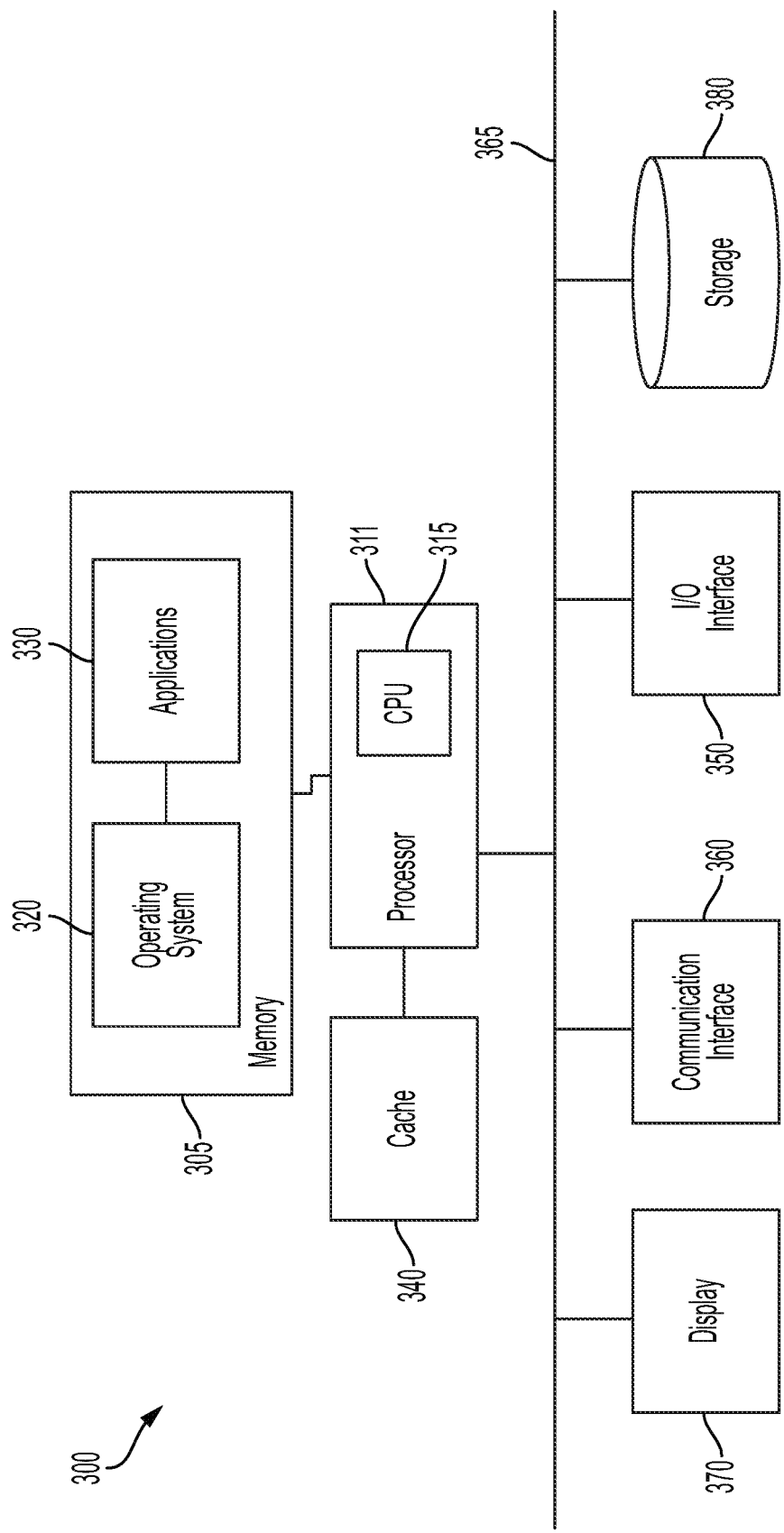
FIG. 10 is a schematic diagram of an electronic device and/or associated system suitable for implementing the garment rendering system of the present invention.

FIG. 10 is a high-level block diagram of an electronic or computing device 300 that can be used with the embodiments disclosed herein. Without limitation, the hardware, software, and techniques described herein can be implemented in digital electronic circuitry or in computer hardware that executes firmware, software, or combinations thereof. The implementation can include a computer program product (e.g., a non-transitory computer program tangibly embodied in a machine-readable storage device, for execution by, or to control the operation of, one or more data processing apparatuses, such as a programmable processor, one or more computers, one or more servers and the like).

The illustrated electronic device 300 can be any suitable electronic circuitry that includes a main memory unit 305 that is connected to a processor 311 having a CPU 315 and a cache unit 340 configured to store copies of the data from the most frequently used main memory 305. The electronic device can implement the process flow identification system 10 or one or more elements of the process flow identification system.

Further, the methods and procedures for carrying out the methods disclosed herein can be performed by one or more programmable processors executing a computer program to perform functions of the invention by operating on input data and generating output. Further, the methods and procedures disclosed herein can also be performed by, and the apparatus disclosed herein can be implemented as, special purpose logic circuitry, such as a FPGA (field programmable gate array) or an ASIC (application specific integrated circuit). Modules and units disclosed herein can also refer to portions of the computer program and/or the processor/special circuitry that implements that functionality.

The processor 311 is any logic circuitry that responds to, processes or manipulates instructions received from the main memory unit, and can be any suitable processor for execution of a computer program. For example, the processor 311 can be a general and/or special purpose microprocessor and/or a processor of a digital computer. The CPU 315 can be any suitable processing unit known in the art. For example, the CPU 315 can be a general and/or special purpose microprocessor, such as an application-specific instruction set processor, graphics processing unit, physics processing unit, digital signal processor, image processor, coprocessor, floating-point processor, network processor, and/or any other suitable processor that can be used in a digital computing circuitry. Alternatively or additionally, the processor can comprise at least one of a multi-core processor and a front-end processor. Generally, the processor 311 can be embodied in any suitable manner. For example, the processor 311 can be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. Additionally or alternatively, the processor 311 can be configured to execute instructions stored in the memory 305 or otherwise accessible to the processor 311. As such, whether configured by hardware or software methods, or by a combination thereof, the processor 311 can represent an entity (e.g., physically embodied in circuitry) capable of performing operations according to embodiments disclosed herein while configured accordingly. Thus, for example, when the processor 311 is embodied as an ASIC, FPGA or the like, the processor 311 can be specifically configured hardware for conducting the operations described herein. Alternatively, as another example, when the processor 311 is embodied as an executor of software instructions, the instructions can specifically configure the processor 311 to perform the operations described herein. In many embodiments, the central processing unit 530 is provided by a microprocessor unit, e.g.: those manufactured by Intel Corporation of Mountain View, Calif; those manufactured by Motorola Corporation of Schaumburg, Ill.; the ARM processor and TEGRA system on a chip (SoC) manufactured by Nvidia of Santa Clara, Calif; the POWER7 processor, those manufactured by International Business Machines of White Plains, N.Y.; or those manufactured by Advanced Micro Devices of Sunnyvale, Calif. The processor can be configured to receive and execute instructions received from the main memory 305.

The electronic device 300 applicable to the hardware of the present invention can be based on any of these processors, or any other processor capable of operating as described herein. The central processing unit 315 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

The processor 311 and the CPU 315 can be configured to receive instructions and data from the main memory 305

(e.g., a read-only memory or a random access memory or both) and execute the instructions. The instructions and other data can be stored in the main memory 305. The processor 311 and the main memory 305 can be included in or supplemented by special purpose logic circuitry. The main memory unit 305 can include one or more memory chips capable of storing data and allowing any storage location to be directly accessed by the processor 311. The main memory unit 305 may be volatile and faster than other memory in the electronic device, or can dynamic random access memory (DRAM) or any variants, including static random access memory (SRAM), Burst SRAM or Synch-Burst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 305 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 305 can be based on any of the above described memory chips, or any other available memory chips capable of operating as described herein. In the embodiment shown in FIG. 4, the processor 311 communicates with main memory 305 via a system bus 365. The computer executable instructions of the present invention may be provided using any computer-readable media that is accessible by the computing or electronic device 300. Computer-readable media may include, for example, the computer memory or storage unit 305. The computer storage media may also include, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer readable storage media does not include communication media. Therefore, a computer storage or memory medium should not be interpreted to be a propagating signal per se or stated another transitory in nature. The propagated signals may be present in a computer storage media, but propagated signals per se are not examples of computer storage media, which is intended to be non-transitory. Although the computer memory or storage unit 305 is shown within the computing device 300 it will be appreciated that the storage may be distributed or located remotely and accessed via a network or other communication link.

The main memory 305 can comprise an operating system 320 that is configured to implement various operating system functions. For example, the operating system 320 can be responsible for controlling access to various devices, memory management, and/or implementing various functions of the asset management system disclosed herein. Generally, the operating system 320 can be any suitable system software that can manage computer hardware and software resources and provide common services for computer programs.

The main memory 305 can also hold application software 330. For example, the main memory 305 and application software 330 can include various computer executable instructions, application software, and data structures, such as computer executable instructions and data structures that implement various aspects of the embodiments described herein. For example, the main memory 305 and application software 330 can include computer executable instructions, application software, and data structures, such as computer executable instructions and data structures that implement various aspects of the content characterization systems disclosed herein, such as processing and capture of information. Generally, the functions performed by the content characterization systems disclosed herein can be implemented in digital electronic circuitry or in computer hardware that executes software, firmware, or combinations thereof. The implementation can be as a computer program product (e.g., a computer program tangibly embodied in a non-transitory machine-readable storage device) for execution by or to control the operation of a data processing apparatus (e.g., a computer, a programmable processor, or multiple computers). Generally, the program codes that can be used with the embodiments disclosed herein can be implemented and written in any form of programming language, including compiled or interpreted languages, and can be deployed in any form, including as a stand-alone program or as a component, module, subroutine, or other unit suitable for use in a computing environment. A computer program can be configured to be executed on a computer, or on multiple computers, at one site or distributed across multiple sites and interconnected by a communications network, such as the Internet.

The processor 311 can further be coupled to a database or data storage 380. The data storage 380 can be configured to store information and data relating to various functions and operations of the content characterization systems disclosed herein. For example, as detailed above, the data storage 380 can store information including but not limited to captured information, multimedia, processed information, and characterized content.

A wide variety of I/O devices may be present in or connected to the electronic device 300. For example, the electronic device can include a display 370, and as previously described, the visual application unit 28 or one or more other elements of the system 10 can include the display. The display 370 can be configured to display information and instructions received from the processor 311. Further, the display 370 can generally be any suitable display available in the art, for example a Liquid Crystal Display (LCD), a light emitting diode (LED) display, digital light processing (DLP) displays, liquid crystal on silicon (LCOS) displays, organic light-emitting diode (OLED) displays, active-matrix organic light-emitting diode (AMO-LED) displays, liquid crystal laser displays, time-multiplexed optical shutter (TMOS) displays, or 3D displays, or electronic papers (e-ink) displays. Furthermore, the display 370 can be a smart and/or touch sensitive display that can receive instructions from a user and forwarded the received information to the processor 311. The input devices can also include user selection devices, such as keyboards, mice, trackpads, trackballs, touchpads, touch mice, multi-touch touchpads, touch mice and the like, as well as microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. The output devices can also include video displays, graphical displays, speakers, headphones, inkjet printers, laser printers, and 3D printers.

The electronic device 300 can also include an Input/Output (I/O) interface 350 that is configured to connect the processor 311 to various interfaces via an input/output (I/O) device interface 380. The device 300 can also include a communications interface 360 that is responsible for providing the circuitry 300 with a connection to a communications network (e.g., communications network 120). Transmission and reception of data and instructions can occur over the communications network.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

Having described the invention, what is claimed as new and desired to be secured by Letters Patent is:

1. A garment rendering system, comprising
   a virtual garment generation unit for receiving garment related data and for generating in response to the garment related data virtual garment data, wherein the garment related data includes garment image data and garment textual data,
   an avatar generation unit for receiving user data and for generating, in response to the user data, user avatar data representative of an avatar of the user, wherein the user data includes at least one of user image data and user biometric data,
   a simulation engine for receiving the user avatar data and the virtual garment data and for generating in response thereto simulated garment data representative of a simulated garment draped on the avatar, and
   a rendering unit for rendering the simulated garment data received from the simulation engine and for generating a rendered virtual image,
   wherein the simulation engine includes
      a tailor unit for receiving the virtual garment data and encoding the virtual garment data with the garment image data to form encoded garment data,
      a graph network configured for receiving the encoded garment data and for generating garment related training data, and
      a one-shot network configured for receiving the garment related training data in order to train the one-shot network, and wherein the one-shot network is configured for receiving the virtual garment data and the user avatar data and for generating based thereon the simulated garment data.

2. The system of claim 1, wherein the virtual garment generation unit comprises
   a pattern determination unit that is configured to receive the garment image data and the garment textual data and to generate two-dimensional garment pattern data based on the garment image and the garment textual data,
   a mesher unit for receiving and processing the two dimensional garment pattern data and for generating, based thereon, a plurality of three-dimensional garment meshes forming at least part of the virtual garment data, and
   a material determination unit configured to determine a type of material associated with the garment based on the garment image data and the garment textual data.

3. The system of claim 2, wherein the mesher unit employs one or more meshing techniques for subdividing the two-dimensional garment pattern data into the plurality of three-dimensional garment meshes.

4. The system of claim 3, wherein the garment related data is indicative at least one garment, and wherein the pattern determination unit comprises
   a classification unit for classifying the garment into one of a plurality of different categories indicative of different types of garments and for generating in response garment classification data,
   an object detection unit configured to receive the garment classification data and for detecting and extracting at least one garment segment from the classification data with an object detection model and for generating garment segment data,
   a landmark extraction unit configured to receive the garment segment data and for detecting and extracting at least landmark feature present within the garment segment data and for generating landmark data, and
   a pattern generation unit configured to receive the landmark data and for generating in response two-dimensional garment pattern data.

5. The system of claim 4, wherein the material determination unit comprises
   a texture map determination unit for applying to the garment related data a semantic segmentation technique to generate one or more texture maps associated with the garment, and
   a parameter determination unit for extracting from the garment textual data one or more fabric parameters associated with a fabric of the garment,
   wherein one or more of the texture maps and the fabric parameters form part of the virtual garment data.

6. The system of claim 5, wherein the simulation engine comprises
   a tailor unit for receiving the virtual garment data and encoding the virtual garment data with the garment image data to form encoded garment data,
   a solver unit for receiving the encoded garment data and generating based thereon the simulated garment data, and
   a feedback loop for feeding back the simulated garment data to the tailor unit for further processing thereby.

7. The system of claim 5, wherein the simulation engine comprises a one shot network for receiving the virtual garment data and the avatar data and for generating based thereon the simulated garment data.

8. The system of claim 7, wherein the one-shot network comprises a convolutional neural network.

9. The system of claim 1, further comprising a feedback loop for feeding back the garment related training data to the tailor unit for further processing thereby.

10. The system of claim 1, wherein the avatar generation unit comprises
    a segmentation unit for processing the user image data and generating silhouette image data, and
    a machine learning unit for receiving the silhouette image data and the user biometric data to form input data, and for applying to the input data one or more machine learning models to generate the avatar.

11. The system of claim 10, wherein the machine learning model comprises a deep learning regression model, and wherein the machine learning unit further generates a plurality of measurements forming part of the avatar related data by employing a learned mapping technique by mapping between a predefined human silhouette and a plurality of body measurements of the user, and applies a statistical anthropomorphic analysis technique to the user biometric data.

12. The system of claim 1, further comprising a fit analysis unit for receiving the virtual garment data and the avatar data and for generating in response thereto garment fit data indicative of a fit of the virtual garment on the avatar.

13. The system of claim 12, wherein the virtual garment data is indicative of a virtual garment, and wherein the fit analysis unit includes a processor programmed to:
  segment the virtual garment into a plurality of garment segments, and
  classify each of the plurality of segments into one or more garment related categories, and
  generate the garment fit data based on the one or more garment related categories.

14. The system of claim 13, wherein the processor is further programmed to generate a texture map indicative of the fit of the garment on the avatar.

15. A method for generating a rendered virtual image of a garment on an avatar of a user, comprising
  generating, in response to receiving garment related data, virtual garment data with a virtual garment generation unit, wherein the garment related data includes garment image data and garment textual data,
  generating with an avatar generation unit, in response to receiving user data, user avatar data that is representative of the avatar of the user, wherein the user data includes at least one of user image data and user biometric data,
  generating with a simulation engine, in response to receiving the user avatar data and the virtual garment data, simulated garment data representative of a simulated garment draped on the avatar, and
  rendering the simulated garment data with a rendering unit and generating the rendered virtual image,
  wherein generating with the simulation engine includes
    encoding with a tailor unit the virtual garment data with the garment image data to form encoded garment data,
    providing a graph network configured for receiving the encoded garment data and for generating garment related training data, and
    providing a one-shot network configured for receiving the garment related training data in order to train the one-shot network, and wherein the one-shot network is configured for receiving the virtual garment data and the user avatar data and for generating based thereon the simulated garment data.

16. The method of claim 15, wherein generating the virtual garment data with the virtual garment generation unit comprises
  generating with a pattern determination unit, in response to receiving the garment image data and the garment textual data, two-dimensional garment pattern data based on the garment image and the garment textual data,
  generating with a mesher unit, in response to receiving and processing the two dimensional garment pattern data, a plurality of three-dimensional garment meshes forming at least part of the virtual garment data, and
  determining with a material determination unit a type of material associated with the garment based on the garment image data and the garment textual data.

17. The method of claim 16, wherein the mesher unit employs one or more meshing techniques, comprising subdividing with the meshing technique the two-dimensional garment pattern data into the plurality of three-dimensional garment meshes.

18. The method of claim 17, wherein the garment related data is indicative at least one garment, and wherein generating with the pattern determination unit comprises
  classifying the garment into one of a plurality of different categories indicative of different types of garments and for generating in response garment classification data,
  detecting and extracting at least one garment segment from the garment classification data with an object detection model and for generating garment segment data,
  detecting and extracting at least landmark feature present within the garment segment data and for generating landmark data, and
  generating in response to the landmark data two-dimensional garment pattern data.

19. The method of claim 18, wherein determining with the material determination unit comprises
  applying to the garment related data a semantic segmentation technique to generate one or more texture maps associated with the garment, and
  extracting from the garment textual data one or more fabric parameters associated with a fabric of the garment,
  wherein one or more of the texture maps and the fabric parameters form part of the virtual garment data.

20. The method of claim 19, wherein generating with the simulation engine comprises
  providing a tailor unit for receiving the virtual garment data and encoding the virtual garment data with the garment image data to form encoded garment data,
  providing a solver unit for receiving the encoded garment data and generating based thereon the simulated garment data, and
  feeding back the simulated garment data to the tailor unit for further processing thereby.

21. The method of claim 19, wherein generating with the simulation engine comprises employing a one shot network for receiving the virtual garment data and the avatar data and for generating based thereon the simulated garment data.

22. The method of claim 15, further comprising feeding back with a feedback loop the garment related training data to the tailor unit for further processing thereby.

23. The method of claim 15, wherein generating with the avatar generation unit comprises
  generating, in response to receiving the user image data, silhouette image data, and
  applying, in response to receiving the silhouette image data and the user biometric data, one or more machine learning models to generate the avatar.

24. The method of claim 23, wherein the machine learning model comprises a deep learning regression model, comprising generating a plurality of measurements forming part of the avatar related data by employing a learned mapping technique by mapping between a predefined human silhouette and a plurality of body measurements of the user, and applies a statistical anthropomorphic analysis technique to the user biometric data.

25. The method of claim 15, further comprising generating with a fit analysis unit, in response to receiving the virtual garment data and the avatar data, garment fit data indicative of a fit of the virtual garment draped on the avatar.

26. The method of claim 25, wherein the virtual garment data is indicative of a virtual garment, further comprising
segmenting the virtual garment into a plurality of garment segments,
classifying each of the plurality of segments into one or more garment related categories, and
generating the garment fit data based on the one or more garment related categories.

27. The method of claim 26, further comprising generating a texture map indicative of the fit of the garment on the avatar.

28. A non-transitory, computer readable medium comprising computer program instructions tangibly stored on the computer readable medium, wherein the computer program instructions are executable by at least one computer processor to perform a method, the method comprising:
generating, in response to receiving garment related data, virtual garment data with a virtual garment generation unit, wherein the garment related data includes garment image data and garment textual data,
generating with an avatar generation unit, in response to receiving user data, user avatar data that is representative of the avatar of the user, wherein the user data includes at least one of user image data and user biometric data,
generating with a simulation engine, in response to receiving the user avatar data and the virtual garment data, simulated garment data representative of a simulated garment draped on the avatar, and
rendering the simulated garment data with a rendering unit and generating the rendered virtual image
wherein generating with the simulation engine includes
encoding with a tailor unit the virtual garment data with the garment image data to form encoded garment data,
providing a graph network configured for receiving the encoded garment data and for generating garment related training data, and
providing a one-shot network configured for receiving the garment related training data in order to train the one-shot network, and wherein the one-shot network is configured for receiving the virtual garment data and the user avatar data and for generating based thereon the simulated garment data.

29. The computer readable medium of claim 28, wherein generating the virtual garment data with the virtual garment generation unit, comprises
generating with a pattern determination unit, in response to receiving the garment image data and the garment textual data, two-dimensional garment pattern data based on the garment image and the garment textual data,
generating with a mesher unit, in response to receiving and processing the two dimensional garment pattern data, a plurality of three-dimensional garment meshes forming at least part of the virtual garment data, and
determining with a material determination unit a type of material associated with the garment based on the garment image data and the garment textual data.

30. The computer readable medium of claim 29, further comprising subdividing with a meshing technique the two-dimensional garment pattern data into the plurality of three-dimensional garment meshes.

31. The computer readable medium of claim 30, wherein the garment related data is indicative at least one garment, and wherein generating with the pattern determination unit comprises
classifying the garment into one of a plurality of different categories indicative of different types of garments and for generating in response garment classification data,
detecting and extracting at least one garment segment from the garment classification data with an object detection model and for generating garment segment data,
detecting and extracting at least landmark feature present within the garment segment data and for generating landmark data, and
generating in response to the landmark data two-dimensional garment pattern data.

32. The computer readable medium of claim 31, wherein determining with the material determination unit, comprises
applying to the garment related data a semantic segmentation technique to generate one or more texture maps associated with the garment, and
extracting from the garment textual data one or more fabric parameters associated with a fabric of the garment,
wherein one or more of the texture maps and the fabric parameters form part of the virtual garment data.

33. The computer readable medium of claim 28, wherein generating with the avatar generation unit comprises
generating, in response to receiving the user image data, silhouette image data, and
applying, in response to receiving the silhouette image data and the user biometric data, one or more machine learning models to generate the avatar.

34. The computer readable medium of claim 33, further comprising generating a plurality of measurements forming part of the avatar related data by employing a learned mapping technique by mapping between a predefined human silhouette and a plurality of body measurements of the user, and applies a statistical anthropomorphic analysis technique to the user biometric data.

35. The computer readable medium of claim 28, further comprising generating with a fit analysis unit, in response to receiving the virtual garment data and the avatar data, garment fit data indicative of a fit of the virtual garment draped on the avatar.

36. The computer readable medium of claim 35, wherein the virtual garment data is indicative of a virtual garment, further comprising
segmenting the virtual garment into a plurality of garment segments,
classifying each of the plurality of segments into one or more garment related categories, and
generating the garment fit data based on the one or more garment related categories.

37. The computer readable medium of claim 36, further comprising generating a texture map indicative of the fit of the garment on the avatar.

* * * * *